United States Patent
Maalouf et al.

(10) Patent No.: US 10,760,728 B1
(45) Date of Patent: Sep. 1, 2020

(54) STAND FOR A TERMINAL SYSTEM WITH ADJUSTABLE SCREEN ORIENTATION

(71) Applicants: Ramzi Khalil Maalouf, Chevy Chase, MD (US); Jinrong Yang, Shanghai (CN)

(72) Inventors: Ramzi Khalil Maalouf, Chevy Chase, MD (US); Jinrong Yang, Shanghai (CN)

(*) Notice: Subject to any disclaimer, the term of this patent is extended or adjusted under 35 U.S.C. 154(b) by 0 days.

(21) Appl. No.: 16/200,579

(22) Filed: Nov. 26, 2018

Related U.S. Application Data

(60) Provisional application No. 62/736,303, filed on Sep. 25, 2018.

(51) Int. Cl.
*F16M 11/10* (2006.01)
*G06F 1/16* (2006.01)

(52) U.S. Cl.
CPC ......... F16M 11/105 (2013.01); G06F 1/1669 (2013.01)

(58) Field of Classification Search
CPC ................. F16M 11/105; G06F 1/1669; G06F 2200/1614; G06F 3/1454; G06F 1/1601; G09G 2340/0492
See application file for complete search history.

(56) References Cited

U.S. PATENT DOCUMENTS

| 6,381,125 B1 * | 4/2002 | Mizoguchi | G06F 1/16 312/223.1 |
|---|---|---|---|
| 2003/0122777 A1 | 7/2003 | Grover | |
| 2006/0152484 A1 | 7/2006 | Borgward | |
| 2008/0192166 A1 * | 8/2008 | Wong | F16M 11/105 349/58 |
| 2009/0040701 A1 * | 2/2009 | Lin | G06F 1/1616 361/679.27 |
| 2011/0031287 A1 * | 2/2011 | Le Gette | F16M 11/04 224/101 |
| 2012/0050331 A1 | 3/2012 | Kanda | |
| 2012/0194448 A1 | 8/2012 | Rothkopf | |
| 2012/0236475 A1 * | 9/2012 | Peng | F16M 11/105 361/679.01 |
| 2012/0242571 A1 | 9/2012 | Takamura et al. | |

(Continued)

OTHER PUBLICATIONS

Applicant-Initiated Interview Summary dated Jul. 18, 2019 in U.S. Appl. No. 15/978,640.

(Continued)

*Primary Examiner* — Abhishek M Rathod
(74) *Attorney, Agent, or Firm* — Chris D. Thompson

(57) ABSTRACT

A terminal system includes a portable computing device and a stand. The stand includes an arm, a coupler movably coupled to the arm and coupled to the portable computing device, and a base removably coupled to the arm. The coupler of the stand allows the portable computing device to move such that the body rotates about an axis perpendicular to the display screen while the arm is in a fixed position. When the arm of the stand is coupled to the base, the base is configurable to support the portable computing device at a desired angle with respect to the surface. The portable electronic device is configured to modify a display on the display screen of the portable computing device in response to the orientation of the portable electronic device.

17 Claims, 22 Drawing Sheets

(56) References Cited

U.S. PATENT DOCUMENTS

| | | | |
|---|---|---|---|
| 2013/0063050 A1* | 3/2013 | Morikawa | G09G 3/001 |
| | | | 315/316 |
| 2013/0088431 A1 | 4/2013 | Ballagas et al. | |
| 2013/0162502 A1 | 6/2013 | Lee et al. | |
| 2013/0180934 A1* | 7/2013 | Hsu | G06F 1/1626 |
| | | | 211/26 |
| 2014/0129948 A1 | 5/2014 | Jones et al. | |
| 2014/0320624 A1 | 10/2014 | Lee et al. | |
| 2015/0082241 A1 | 3/2015 | Kang et al. | |
| 2016/0173664 A1 | 6/2016 | Lewis | |
| 2017/0262053 A1 | 9/2017 | Noh | |
| 2018/0088666 A1 | 3/2018 | Ayoub | |
| 2019/0318710 A1 | 10/2019 | Gurr et al. | |
| 2019/0333479 A1 | 10/2019 | Maalouf et al. | |

OTHER PUBLICATIONS

Final Office Action dated Oct. 31, 2019 in U.S. Appl. No. 15/978,640.
International Search Report and Written Opinion for International Application No. PCT/US2018/032571 dated Jan. 16, 2019, 14 pages.
Notice of Allowance dated Jan. 27, 2020 in U.S. Appl. No. 15/978,640.
Office Action dated May 1, 2019 in U.S. Appl. No. 15/978,640.
Office Action dated Oct. 3, 2019 in U.S. Appl. No. 16/200,420.

\* cited by examiner

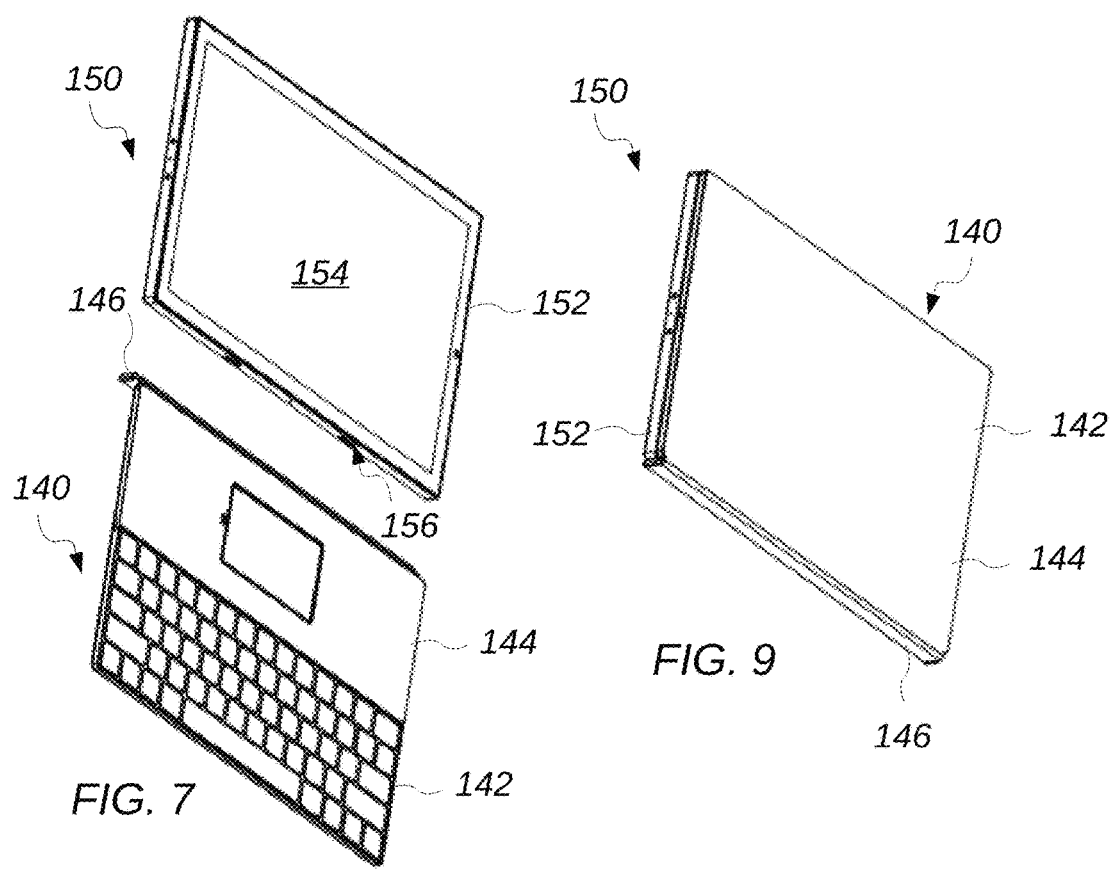
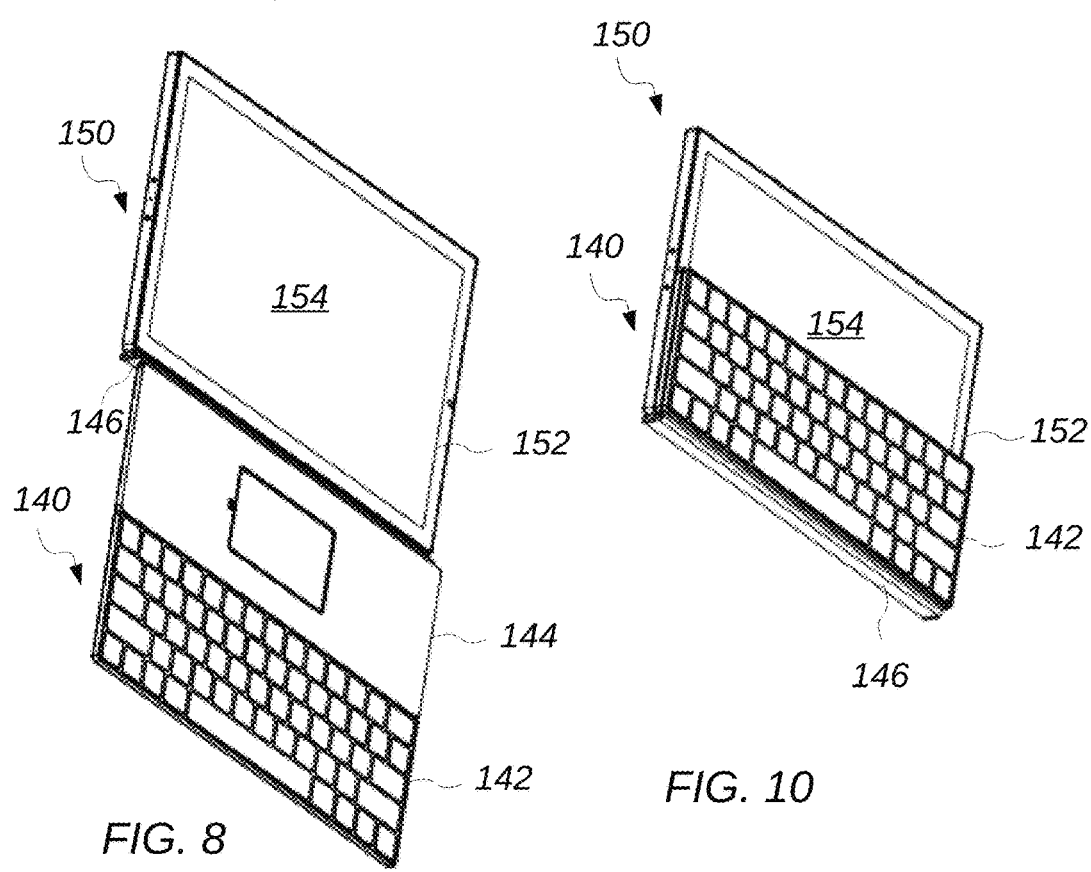

STAND FOR A TERMINAL SYSTEM WITH ADJUSTABLE SCREEN ORIENTATION

PRIORITY CLAIM

This application claims priority to U.S. Application Ser. No. 62/736,303, entitled "INTEGRATED MODULAR KEYBOARD AND STAND FOR A TERMINAL SYSTEM WITH ADJUSTABLE SCREEN ORIENTATION", filed Sep. 25, 2018, which is incorporated by reference as if fully set forth herein.

BACKGROUND

Field

The present invention relates to the field of touch screen computing devices, and input devices and accessories for using and supporting such computing devices, as well as a system reconfiguration. More specifically, embodiments herein relate to a stand for a terminal with an adjustable screen orientation.

Description of the Related Art

The touch keyboard (physical and virtual) is still the primary data entry system for all touch panel terminals.

External physical keyboards are inconvenient, bulky, and need cable or wireless access connections and typically a mouse for input. Yet, many users like the feel of a physical keyboard.

Similarly, built-in virtual keyboards in touch panel terminals take up a substantial portion of the available screen space. Virtual keyboards also disappear once any point outside the keyboard is touched, which is quite frustrating at times.

Portable computing devices are employed in a myriad of physical settings. Some traditional portable computing devices may not provide a user with optimal ergonomics or sufficient flexibility in providing input to the device for particular settings. Among other things, many traditional devices may not present display information in the orientation best suited to a particular situation, or do not have the proper built-in accessories that provide support for these particular settings.

SUMMARY

Terminal systems including a portable computing device with a stand allowing for an adjustable screen orientation are described. In an embodiment, a stand for a portable computing device includes an arm and a coupler. The coupler is movably coupled to the arm and coupled to the portable computing device. The coupler of the stand allows the portable computing device to move such that the body rotates about an axis perpendicular to the display screen while the arm is in a fixed position. The arm of the stand includes a distal end. The arm is positionable with respect to the portable computing device such that, when a portion of the portable computing device is resting on a surface, the distal end of the arm can rest on the surface so as to maintain the portable computing device at a desired angle with respect to the surface.

In an embodiment, a terminal system includes a portable computing device and a stand. The portable computing device includes a body, a display screen, and a processor. The stand includes an arm, a coupler, and a base. The coupler of the stand allows the portable computing device to move such that the body rotates about an axis perpendicular to the display screen while the arm is in a fixed position. When the arm of the stand is coupled to the base, the base can support the portable computing device at a desired angle with respect to the surface.

In an embodiment, a method includes rotating a portable computing device relative to the arm of a stand for the device to alter a screen orientation relative to the arm, and arranging the arm to at least partially support the portable computing device on a surface with the display screen at a user-selected angle relative to the surface.

BRIEF DESCRIPTION OF THE DRAWINGS

FIG. 7 illustrates a modular physical keyboard positioned next to a touch screen device.

FIG. 8 illustrates a modular physical keyboard coupled to a touch screen device.

FIG. 9 illustrates a modular physical keyboard in place as a cover for a touch screen device.

FIG. 10 illustrates a modular physical keyboard on a touch screen device with the modular physical keyboard folded to expose a portion of touch display screen.

Figure 1:
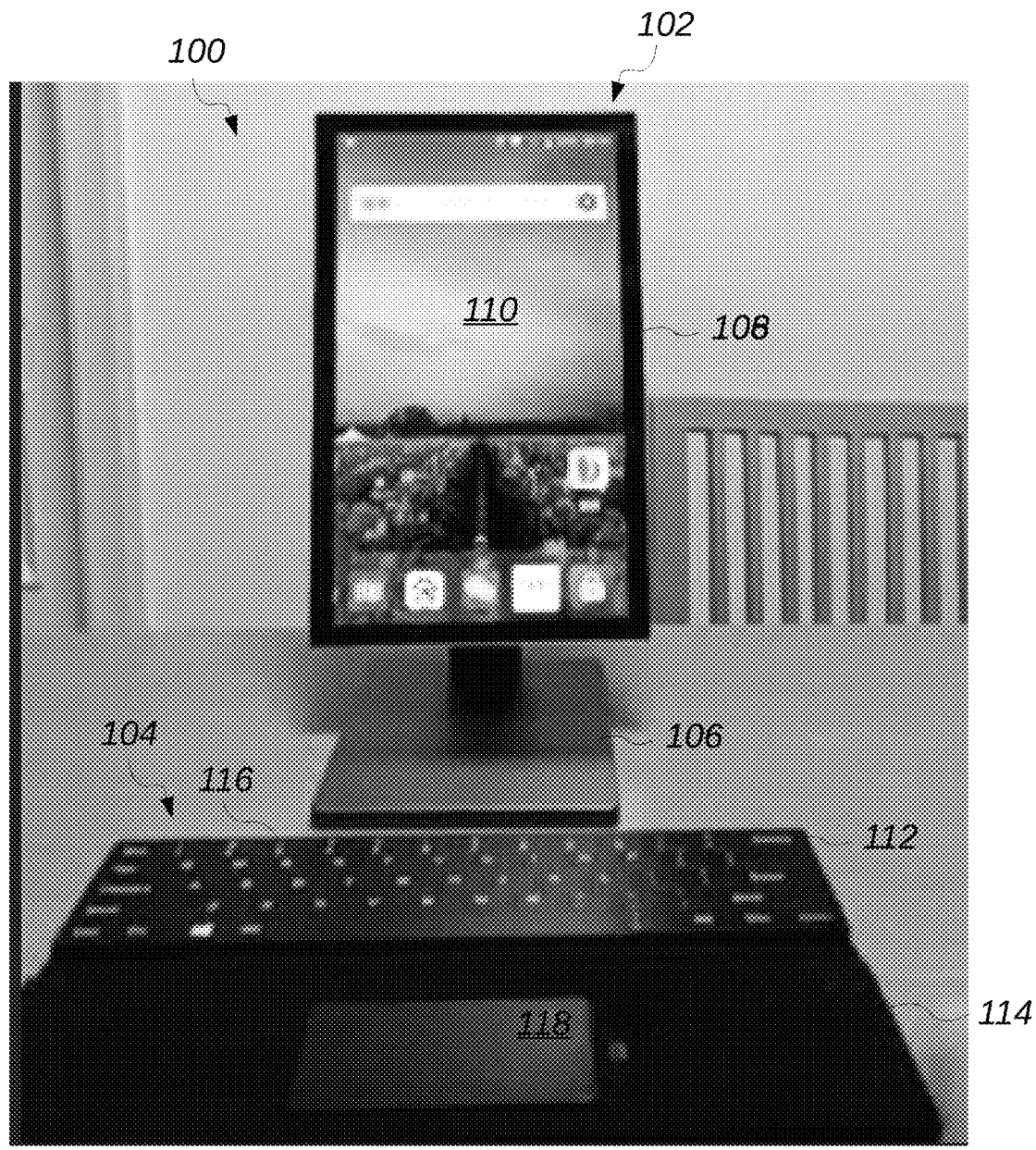
FIG. 1 illustrates one embodiment of a terminal system including a touch-screen device, a modular physical keyboard with pointing device, and a stand.

While the invention is described herein by way of example for several embodiments and illustrative drawings, those skilled in the art will recognize that the invention is not limited to the embodiments or drawings described. It should be understood that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF ILLUSTRATIVE EMBODIMENTS

In various embodiments, terminal systems including portable computing devices, physical keyboards for using the devices, and touchpad devices, stands and other accessories for such devices and their components, and methods for using such devices and accessories are described. A modular physical keyboard ("MPK") panel used with a touch screen computing device as described herein may enhance the human-machine interaction. The MPK may serve as a user input module for operating the computing device, in addition to or instead of the touch screen.

In one embodiment, the MPK panel includes a removable physical keyboard module and a removable touchpad module. The MPK panel may be used as a solid protective cover for the touchscreen display. The MPK panel can be easily and seamlessly connected and removed from the touch-screen device. In some embodiments, the MPK is made of a flat, flexible and foldable solid material.

In some embodiments, a touchpad module can be removed from the one-piece keyboard panel, to enable it to be removed from the MPK panel and used, at the user's option, as either a touchpad and/or as a remote control.

The MPK panel may include different sections (e.g., sub-panels) that each house a different user interface device. The sections may be coupled to another in a manner that permits movement of the sections with respect to one another. For example, a section including a physical keyboard of an MPK panel may be connected to another section including a pointing device by a way of flexible strip or hinge member. In some embodiments, an MPK panel includes one section having a physical keyboard that folds with respect to another section having a touchpad.

In certain embodiments, the input keys of the keyboard module may be separate from the device to enable the device to be removed from the MPK panel and overlaid onto the virtual keyboard or to remain within the flexible and foldable MPK module to achieve a full and complete integration with the touch screen display.

The physical keyboard module can be removed from the MPK panel and used independently to operate the touch screen display. In some embodiments, the physical keyboard module is made of a transparent material and over-laid onto the virtual keyboard to reveal the content below, as further described herein. Alternately, the physical keyboard module can remain embedded into the MPK panel such that the panel can be physically connected to the touch-screen display or not to be physically connected to the touch-screen display (wirelessly operated and not touching the touch-screen display) or with the physical keyboard module portion overlaid onto the touch-screen display virtual keyboard area with the remainder of the MPK panel folded back 180 degrees flush with the back of the MPK panel.

The touchpad removable module may also be embedded in the MPK panel and operates as a standard touchpad when it is embedded in the MPK panel. The touchpad module can also be removed from the MPK panel and used independently to operate the touch screen display. In this detached state, the touchpad module can be operated as a standard touchpad panel (same as when it is embedded in the MPK panel) on one side, and also as a remote control (including programmable option) on the other side.

Touch-Screen Terminal System with Multi-Function Modular Physical Keyboard and Pointrt Device FIG. 1 illustrates one embodiment of terminal system 100 including touch-screen device 102 and modular physical keyboard 104 (shown as 102 in FIG. 1). Touch screen device is mounted on stand 106.

Touch screen device 102 includes housing 108 and touch screen display 110. Touch screen display 110 includes a display area for displaying text, graphics, or other content. Touch screen display 110 may include a virtual keyboard including a set of virtual keys.

Touch screen device 102 is coupled to stand 106. Touch screen device 102 may be coupled such that touch screen display 110 can rotate about an axis that is normal to touch screen display 110. Thus, for example, touch screen device 102 can be rotated such that touch screen display 110 rotates from the "portrait" orientation shown in FIG. 1 to a "landscape" orientation in which the widest dimension of touch screen display 110 is arranged horizontally (90 degrees from that shown in FIG. 1), or anywhere in between. In some embodiments, touch screen device 102 is an intelligent terminal in which the content display on touch screen device 102 is automatically adjusted when the orientation of touch screen device 102 is altered.

In certain embodiments, an actuator performs rotation of touch screen device 102 to the desired orientation. The actuator may operate in response to signals received from touch screen device 102.

In some embodiments, a user input device can be alternately used while attached to a touch screen device or as a stand-alone device. For example, modular physical keyboard 104 may be removed from its location on a surface (e.g., a desk) and attached to touch screen device 102.

Foldable Modular Keyboard

In some embodiments, a user input device includes two or more sections having different user input devices. The sections may fold with respect to one another. For example, user input module 104 shown in FIG. 1 includes keyboard section 112 and touchpad section 114. Keyboard section 112 and touchpad section 114 may be foldable with respect to one another. Keyboard section 112 includes keyboard 116. Touchpad section 114 includes touchpad 118.

Figure 2:
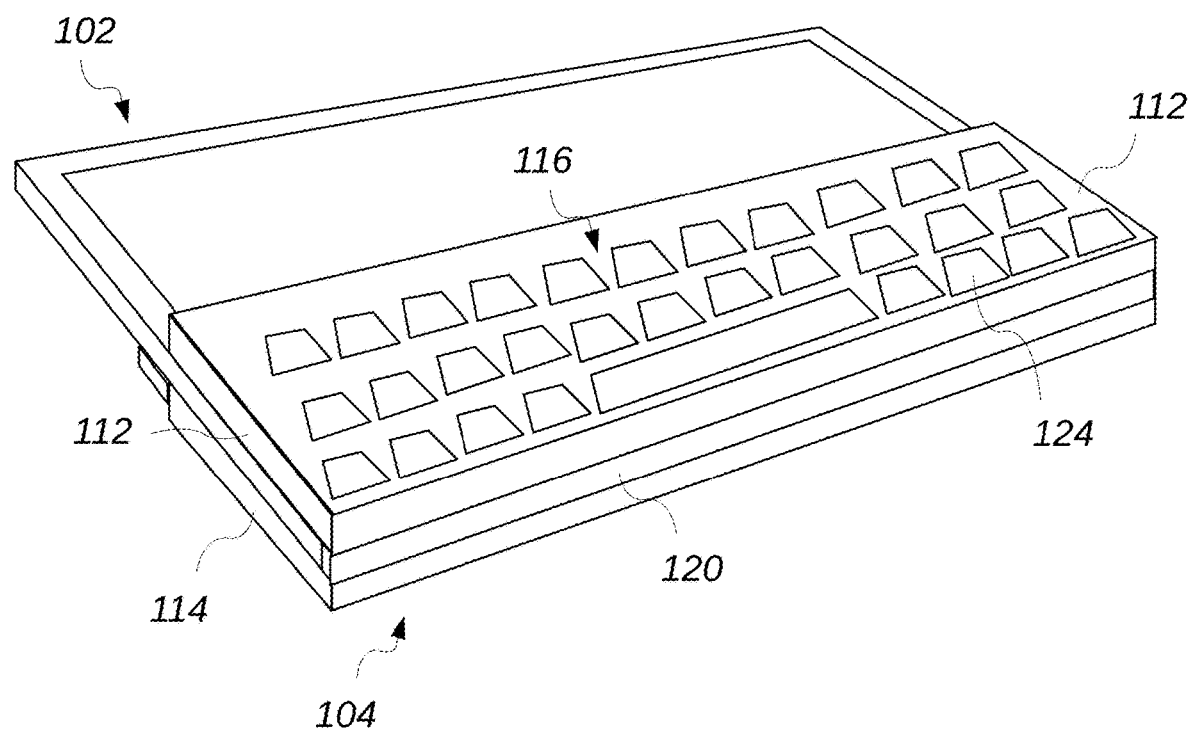
FIG. 2 illustrates a physical keyboard module installed on a touchscreen device.

FIG. 2 illustrates a physical keyboard module installed on a touchscreen device. Modular physical keyboard 104 is folded into an installed position on touch screen device 102. In this case, keyboard section 112 of user input module 104 is on the top side of touchscreen device 102, partially covering the display screen. Touchpad section 114 of physical keyboard module 104 is folded under to a position against the rear surface of touch screen device 102. Linking strip 120 of physical keyboard module 104 interconnects keyboard section 112 and touchpad section 114. Linking strip 120 is sized so that keyboard section 112 and touchpad section 114 both lie flat against their respective contact surfaces of touch screen device 102.

Keyboard 116 includes base 122 and physical keys 124. Physical keys 124 may be arranged in a manner suitable for use for user input to a computing device using touch screen device 102. In one embodiment, physical keys 124 are arranged so as to form a QWERTY keyboard.

Modular physical keyboard 104 may automatically connect to the controller of touch screen device 102. Connection may be accomplished by wired or wireless connection, by way of a USB, blue-tooth RF or IR connection. In this manner, keyboard 116 of keyboard section 112 can be used to operate touch screen device 102. In some embodiments, all or a portion of the touchscreen display underneath keyboard section 112 is visible to the user (e.g., a transparent or translucent keyboard 124). In other embodiments, the part of the touchscreen display underneath keyboard section 112 is obscured from view to the user, in which case the user may rely solely on the portion of the display screen that is still visible (e.g., the upper part of the screen).

Modular physical keyboard 104 may include clips or other attachment hardware for positioning and holding modular physical keyboard 104 on touch-screen device 102. Modular physical keyboard 104 may be removable from touch screen device 102. Removing modular physical keyboard 104 exposes additional area of touch-screen display device 102.

Figures 3A, 3B:
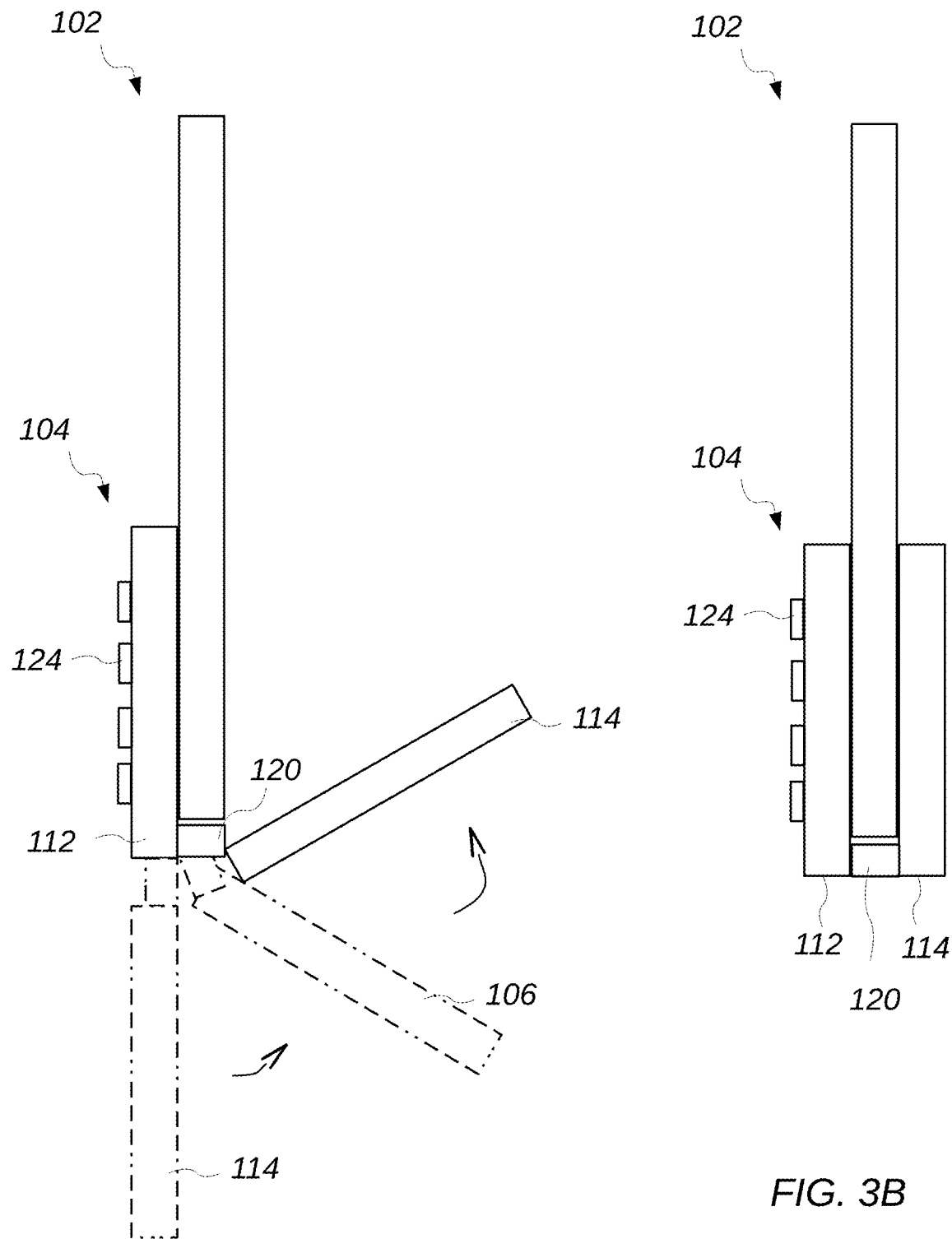
FIGS. 3A and 3B illustrate folding back of a touchpad onto the rear of a touch screen device.

FIGS. 3A and 3B illustrate folding back of a touchpad onto the rear of a touch screen device. In FIG. 3A, touchpad section 114 is folded from a coplanar relationship with keyboard section 112 to the rear of touch screen device 102. In certain embodiments, linking strip 120 is a flexible element (e.g., made of an elastomeric material such as rubber). Linking strip 120 may be connected to keyboard section 112 and/or touchpad section 114 by way of one or more hinges.

When the terminal system is not in use, modular physical keyboard 104 serve as a cover for touch screen device 102. For covering the display, keyboard section 112 are unfolded into a co-planar arrangement (such as shown in phantom lines in FIG. 3A). Each of keyboard section 112 and touchpad section 114 may cover a portion of the display screen of touch screen device 102.

Figure 4:
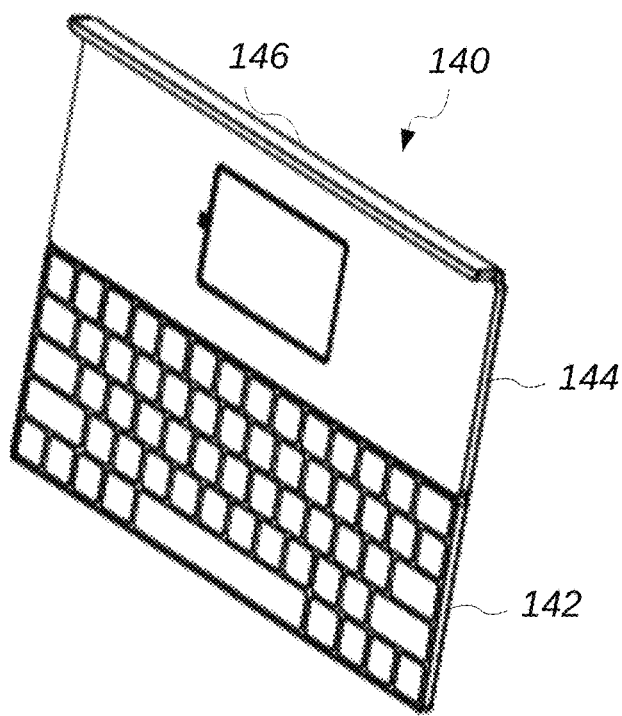
FIGS. 4-6 illustrate one embodiment of a modular physical keyboard including end-attachment strip.
Figure 5:
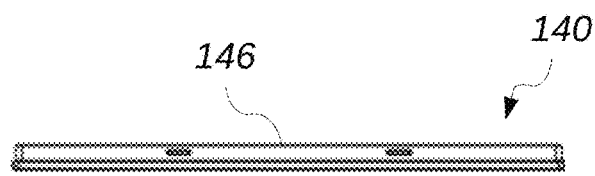
Figure 6:
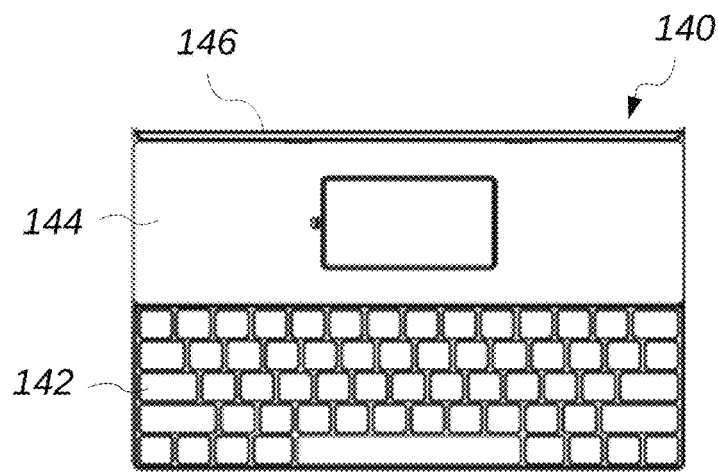

In some embodiments, a user input module includes one or more components for securing the user input module as a cover to the portable computing device. FIGS. 4-6 illustrate one embodiment of a modular physical keyboard including end-attachment strip. Modular physical keyboard 140 includes keyboard section 142, touchpad section 144, and end attachment strip 146. Keyboard section 142 and touchpad section 144 may be foldable with respect to one another. In some embodiments, end attachment strip 146 is hingably attached to touchpad section 144.

In some embodiments, two or more sections of a user input module are arranged on top of a touch screen device so that a portion of the display screen is exposed to view. The sections of the user input module may also be arranged to form a cover for the screen of the touch screen device. FIGS. 7-10 illustrate a modular physical keyboard (which may similar to the one described above in FIGS. 4-6 above).

FIG. 7 illustrates a modular physical keyboard positioned next to a touch screen device. In FIG. 7, modular physical keyboard 140 is separate from touch screen device 150. Touch screen device 150 includes body 152 and display screen 154. Body 152 includes a pair of sockets 156.

End attachment strip 146 and the corresponding edge of touch screen device 152 may include complementary elements for physically and/or electrically connecting modular physical keyboard 140 to touch screen device 150. Examples of complementary elements include a pin and socket connection, tongue-and-groove connection, snaps, or hooks. In one embodiment, modular physical keyboard 140 and touch screen device 150 are connected using a magnetic connection.

FIG. 8 illustrates a modular physical keyboard coupled to a touch screen device. In FIG. 8, end attach strip 146 may be engaged in sockets 156 of touch screen device 150 so as to connect modular physical keyboard 140 with touch screen device 150. Modular physical keyboard 140 may be operated by a user to control modular physical keyboard 140.

FIG. 9 illustrates a modular physical keyboard in place as a cover for a touch screen device. To arrange the system as shown in FIG. 9, keyboard section 142 and touchpad section 144 may be swung over touch screen device 150 while end attachment strip 146 remains fixed to the edge of touch screen device 150.

FIG. 10 illustrates a modular physical keyboard on a touch screen device with the modular physical keyboard folded to expose a portion of touch display screen. To arrange the system as shown in FIG. 10, keyboard section 142 and touchpad section 144 may be folded with respect to one another and touch screen device 150 so that touchpad section 144 is sandwiched between the lower portion of touch screen device 150 and keyboard section 142.

Similar to what was described above relative to the embodiment shown in FIG. 2, modular physical keyboard 140 may automatically connect to the controller of touch-screen device 142. Connection may be accomplished by wired or wireless connection, by way of a USB, blue-tooth RF or IR connection. In this manner, the keyboard of keyboard section 142 can be used to operate touch screen device 142. In some embodiments, all or a portion of the touchscreen display underneath keyboard section 142 is visible to the user (e.g., a transparent or translucent keyboard). In other embodiments, the part of the touchscreen display underneath keyboard section 142 is obscured from view to the user, in which case the user may rely solely on the portion of the display screen that is still visible (e.g., the upper part of the screen).

Figure 11:
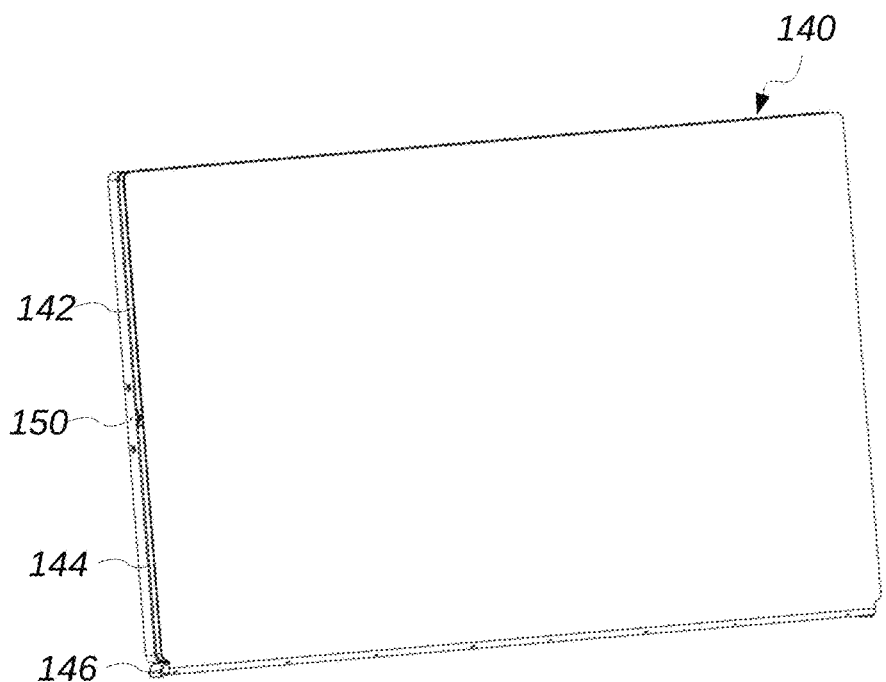
FIG. 11 illustrates a modular physical keyboard arranged as a cover for a touch screen device.
Figure 12:
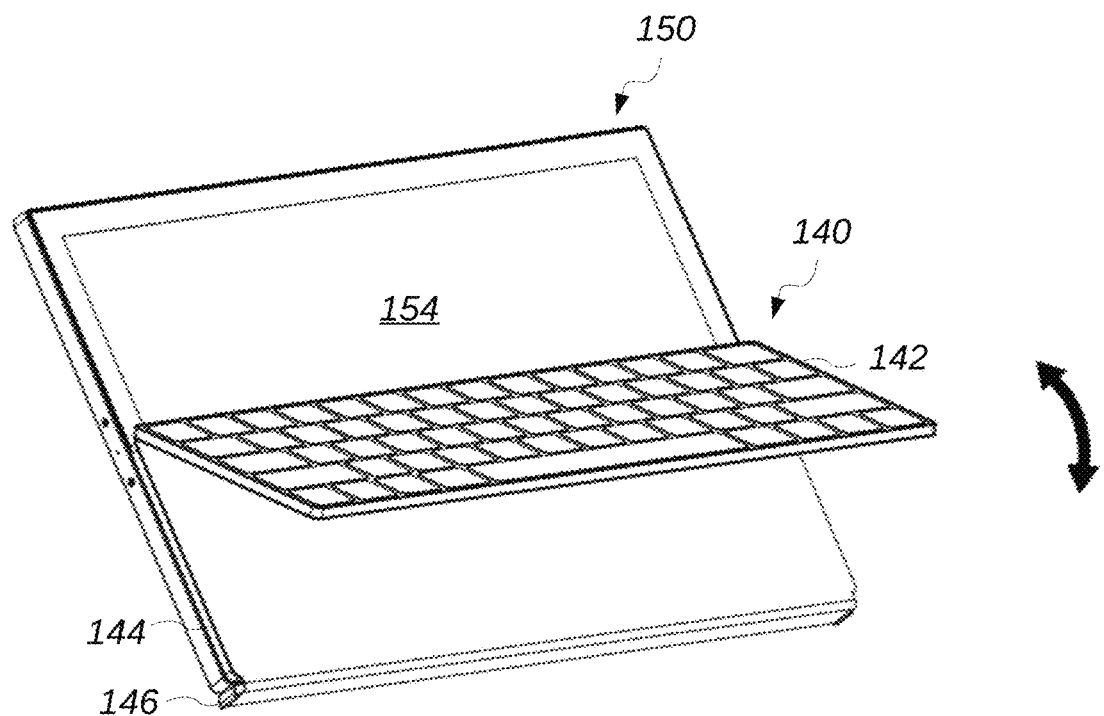
FIG. 12 illustrates a section of a modular physical keyboard being folded away from a touch screen device to expose a portion of a touch screen display.
Figure 13:
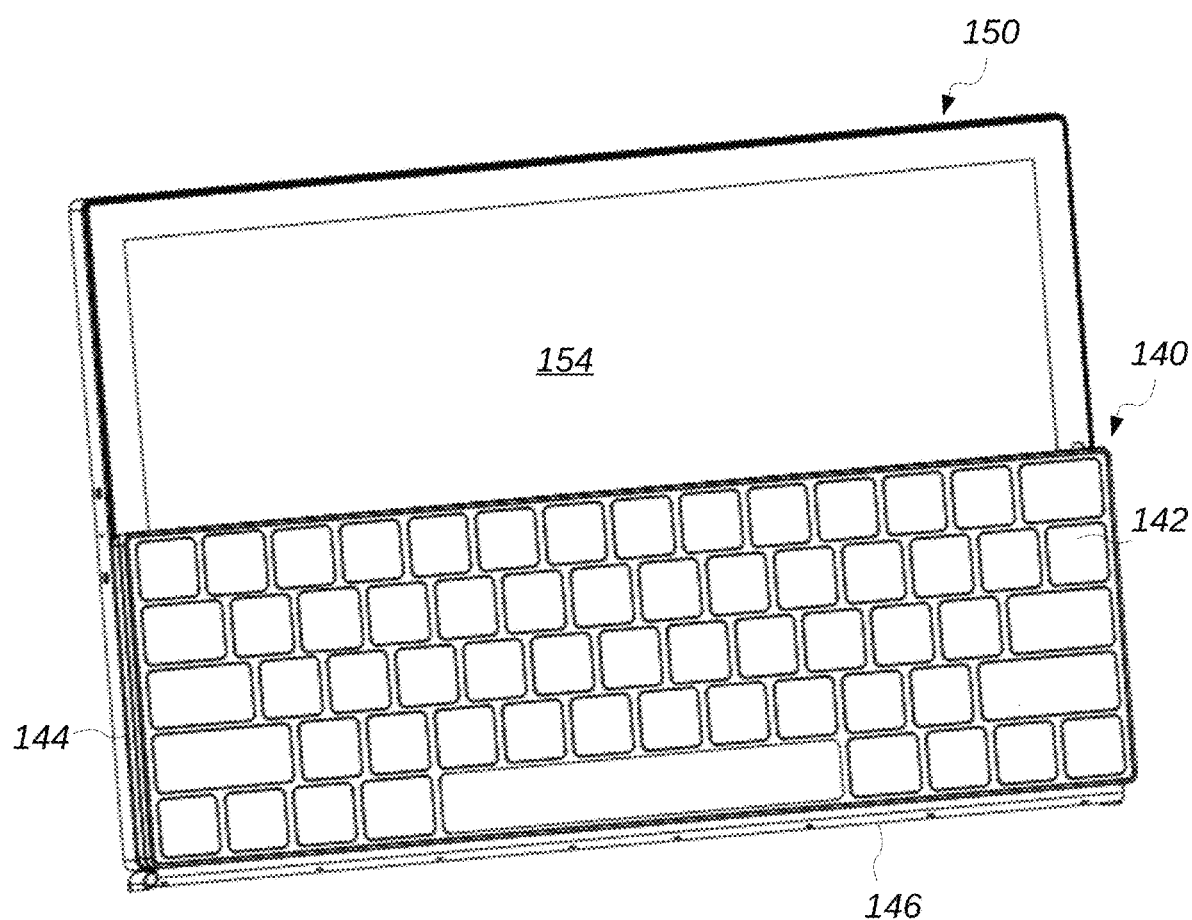
FIG. 13 illustrates a terminal system with a modular physical keyboard in a deployed position in which the user can see and provide input to a portion of a touch screen display.

FIGS. 11 to 13 illustrate one embodiment of transition of a touch screen device with a modular physical keyboard from a covered configuration to a deployed configuration. In FIG. 11, keyboard section 142 and touchpad section 144 of modular physical keyboard 140 are folded out in a co-planar arrangement in which keyboard section 142 and touchpad section 144 combine to cover display screen 154 of touch screen device 150. Attach strip 146 may be in contact with the adjoining edge of touch screen device 150. In FIG. 12, keyboard section 142 is folded away from touch screen device 150 about a hingeable connection with touchpad section 144, thereby exposing the upper portion of display screen 154 for use. In FIG. 13, keyboard section 142 lies flat over the bottom portion of display screen 154. At this point, touchpad section 144 lies under keyboard section 142. In certain embodiments, the physical keyboard is used in lieu of, or in combination with, a virtual keyboard of the touch screen device.

Figure 14A:
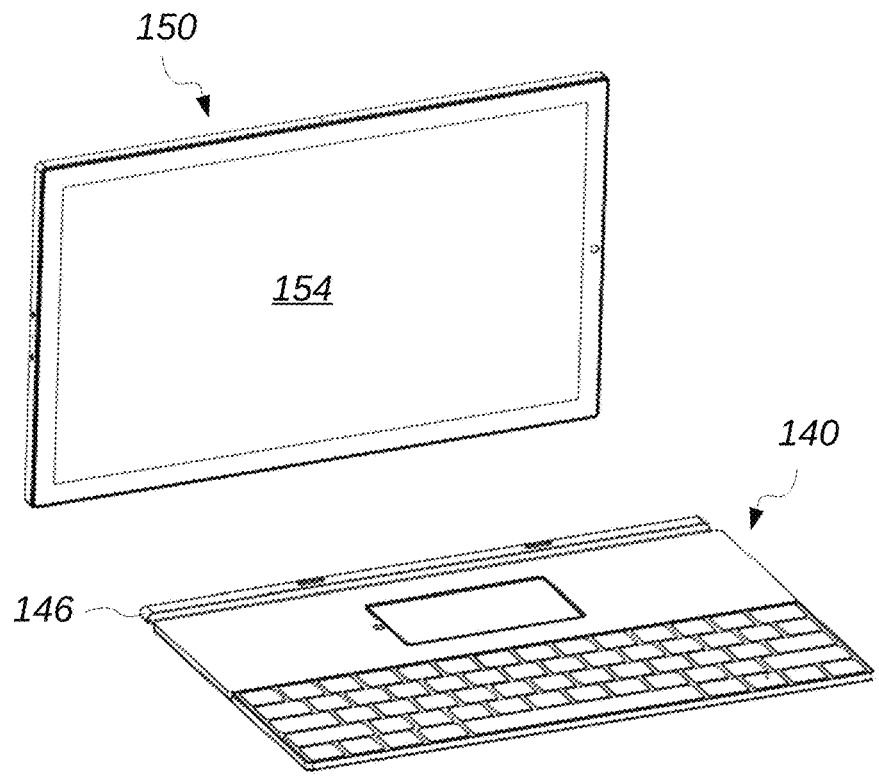
FIG. 14A illustrates an embodiment of a touch screen device in a horizontal orientation separated from an integrated modular keyboard.
Figure 14B:
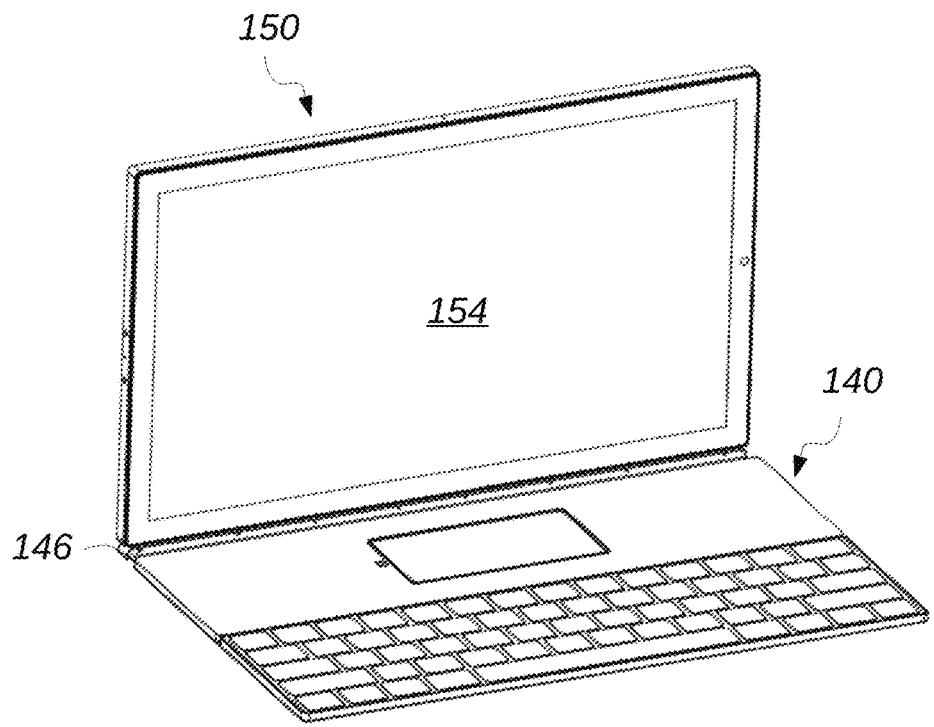
FIG. 14B illustrates an embodiment of a touch screen device in a horizontal orientation coupled to an integrated modular keyboard to allow use of the keyboard with the touch screen device with the display screen full exposed to view of the user.

FIG. 14A illustrates an embodiment of a touch screen device in a horizontal orientation separated from an integrated modular keyboard. FIG. 14B illustrates an embodiment of a touch screen device in a horizontal orientation coupled to an integrated modular keyboard to allow use of the keyboard with the touch screen device with the display screen full exposed to view of the user. Touch screen device 150 may be coupled to modular physical keyboard 140 by way of connection strip 146.

Removable Touchpad/Remote Control Unit

In some embodiments, a user input module for a computing system includes a detachable pointing device. The user input module may include a keyboard. The removable pointing device may include a remote device for operating a portable computing device (e.g., touchscreen device). In one embodiment, the remote device controls are on the bottom side of touchpad device.

Figure 15:
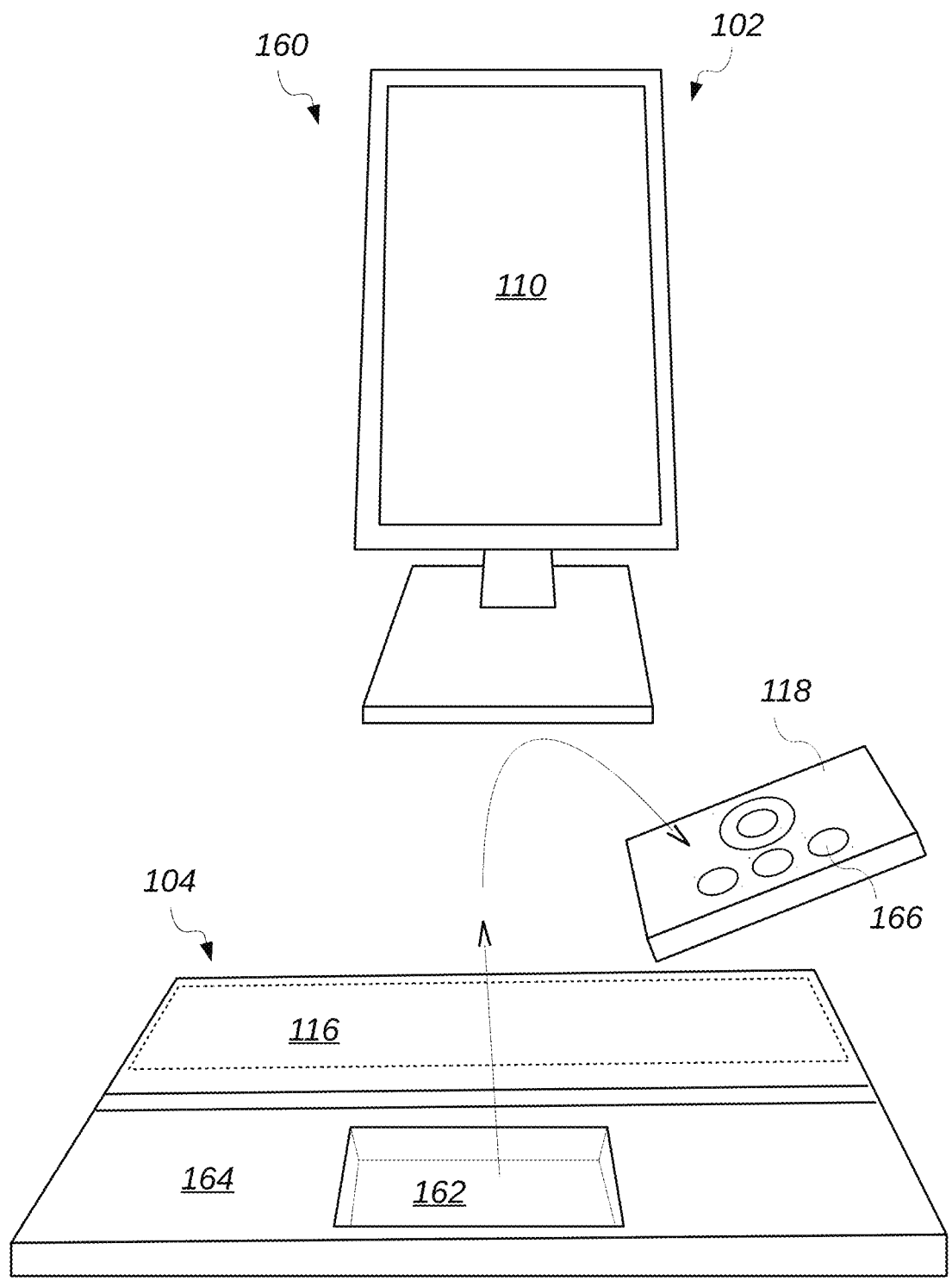
FIG. 15 illustrates one embodiment of a terminal system including a removable touchpad/remote module.

FIG. 15 illustrates one embodiment of a terminal system including a removable touchpad/remote module. System 160 may be as described above relative to FIGS. 1 and 2. Modular physical keyboard 104 includes touchpad/remote module 118. When touchpad/remote module 118 is operated as a touchpad for touch screen device 102, touchpad/remote module 118 may be installed in recessed seat 162 of carrier 164, such as shown in FIG. 15. Alternatively, if a user wishes to use touchpad/remote module 118 as a remote unit, touchpad/remote module 118 may be removed from recessed seat 162. In some embodiments, a release mechanism (e.g., a manually activated eject lever) is provided to urge touchpad/remote module 118 from recessed seat 162. Touchpad/remote module 118 includes remote controls 166. Remote controls 166 may include a mouse and media controls (e.g., play, stop, fast-forward, remind, record).

Touchpad section 114 may be folded with respect to keyboard section 112. For example, the touchpad section may be folded behind touch screen device 102, such as described above relative to FIGS. 1-3, or folded in alternating fashion on top of touchscreen device, such as described with respect to FIG. 10.

Figure 16A:
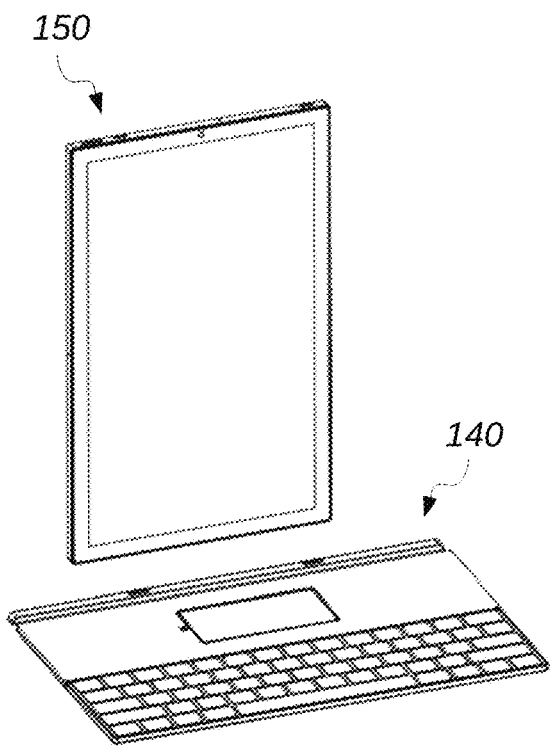
FIGS. 16A and 16B illustrates another embodiment of a terminal system including a removable touchpad/remote module.
Figure 16B:
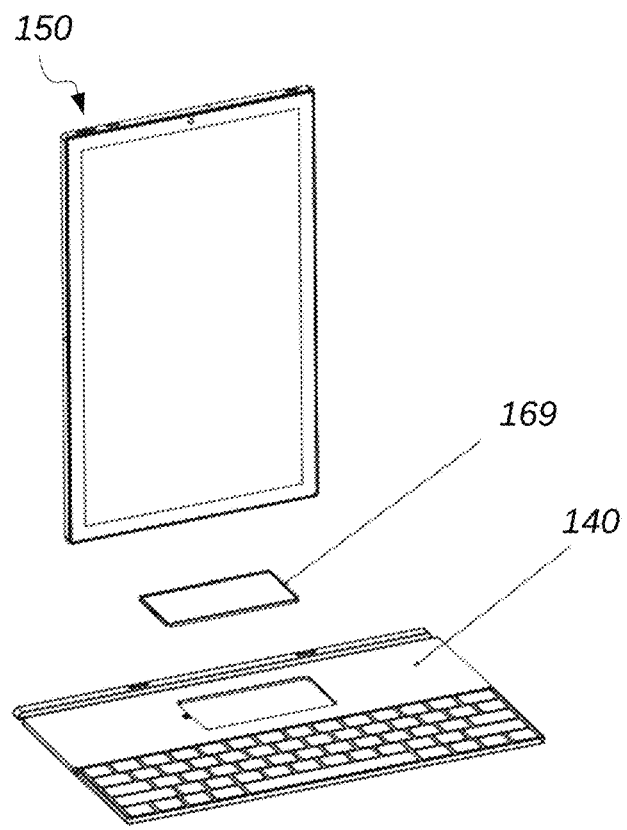

FIGS. 16A and 16B illustrates another embodiment of a terminal system including a removable touchpad/remote module. The terminal system includes touch screen device 150 and module physical keyboard 140, which may be as described above relative to FIGS. 7-14. Touchpad/remote module 169 may be held in a pocket on the upper surface of modular physical keyboard 140 (as shown in FIG. 16A), where it can be used as a touchpad for touch screen device 160. Touchpad/remote module 169 may be removeable from modular physical keyboard 140, as shown in FIG. 16B. Touchpad/remote module 169 may be, at the user's option, used as a touchpad or flipped over and used as a remote control unit for operating touch screen device 150.

Integration of a Physical Keyboard into a Terminal System with a Virtual Keyboard In various embodiments, a physical keyboard is integrated into a touch panel's input system of a device, as an option to the device's virtual keyboard. Some examples of integration of a physical keyboard into a touch panel's input system of a device are described in U.S. patent application Ser. No. 15/979,470 filed May 15, 2018, entitled "Integration of a Physical Keyboard into a Terminal System with a Virtual Keyboard", which is incorporated by reference as if fully set forth herein.

In one embodiment, a transparent physical keyboard is integrated into the touch panel's input system of a device, as an option to the device's virtual keyboard on which the physical keyboard is overlaid matching the exact keys and area of the virtual keyboard. The physical keyboard is made of a see-through touch sensitized material (silicone rubber or plastic or PVC sheet, etc.) to enhance the user's natural feel touch experience, and is transparent to allow viewing of the screen below it. The physical keyboard is seamlessly overlaid onto the screen and retracted to the back of the terminal; it is also removable. The physical keyboard layout and input coordinates match exactly those of the virtual keyboard. The terminal screen can exhibit images and data onto one or more display areas such as, in particular, onto the substantial display area concealed by the virtual keyboard which is now visible below the transparent physical keyboard.

In another embodiment, the physical keyboard is the same as described above but may be opaque, translucent, or transparent and does not overlay (cover) any part of the screen such that the terminal's screen can exhibit images and data onto the entire screen display area including the space previously occupied by the virtual keyboard. In this embodiment, the physical keyboard is configured to connect to the device via USB, Bluetooth, RF or IR, or other.

In physical screen embodiments, the virtual keyboard may also be enhanced to be fixed onto the touch screen until removed with a user command. The terminal's touch panel can receive input independently from both the screen's main display area and from either keyboard in use, using a single finger. The terminal's screen can also be independently moved (scrolled) when the (virtual or physical) keyboards are in use.

In various embodiments, a physical keyboard couples to a touch panel device such that the at least a portion of the physical keyboard is above the display screen. In this context, "above" a display screen includes the physical keyboard being over the screen such the physical keyboard is between the screen and the eye of the user.

In some embodiments, the physical keyboard is made of a see-through touch sensitized material (silicone rubber or plastic or PVC sheet, etc.) to enhance the user's natural feel touch experience. Except for the keys identification on its surface, the physical keyboard is fully transparent to allow viewing of the screen below it.

The physical keyboard in the above embodiment is seamlessly overlaid onto the screen. The physical keyboard layout and input coordinates match those of the virtual keyboard. For example, the "a" key of the physical keyboard is above the "invisible" designation of the "a" key of the virtual keyboard, such that when the user presses the "a" key on the physical keyboard the at least one processor will respond exactly as if the "a" key was pressed on the virtual keyboard, and so on.

In another embodiment, the physical keyboard is the same as described above but is not necessarily transparent and does not overlay (cover) any part of the screen such that the terminal's screen can exhibit images and data onto the entire screen display area including the space previously occupied by the virtual keyboard. In this embodiment, the physical keyboard is configured to connect to the device via USB, Bluetooth, RF or IR, or other.

In some embodiments, the virtual keyboard is enhanced to be fixed onto the touch screen until removed with a user command.

The terminal's touch panel can receive input independently from both the screen's main display area and from either keyboard in use. In some embodiments, the terminal's screen can exhibit images and data onto one or more display areas such as, for example, onto the substantial display area concealed by the virtual keyboard, which may now be visible below the transparent physical keyboard, or onto the entire screen display area including the space previously occupied by the virtual keyboard. The freedom to choose multiple inputs and display options may enhance the user experience and the human-machine interaction.

In some embodiments, a physical keyboard is integrated as an option to the built-in virtual keyboard. The built-in virtual keyboard may turn on by default unless the physical keyboard is detected.

The physical keyboard may be seamlessly overlaid and clipped onto the screen. Clips may wrap around the back of the housing of the touch screen device. In certain embodiments, the physical keyboard is held on by way of snap-on connection. In some embodiments, the physical keyboard is held on to the touch screen device by way of a magnetic connection.

Although, in some of the embodiments described above, the physical keyboard is attached to the touch screen device using integral clips, other forms of attachment may be used in various embodiments. In addition, clips or other mounting hardware may be separate component from the physical keyboard (rather than, for example, integrated into the physical keyboard).

Although, in various embodiments described above, a physical keyboard has been described as being at least partially transparent, a physical keyboard and/or each of its keys may be opaque. In addition to the physical keys, a physical keyboard may include touch sensors, power components, printed circuit boards, wireless adapters, batteries, and various other components for housing or supporting the keys and/or enabling connectivity with a touch screen device.

In some embodiments, a physical keyboard may be made of a transparent touch sensitized material (silicone rubber or plastic or PVC sheet, etc.) to enhance the user's natural feel touch experience and to allow viewing of the screen data below the keyboard area.

Stand Allowing Rotation of Display Screen

Figure 17:
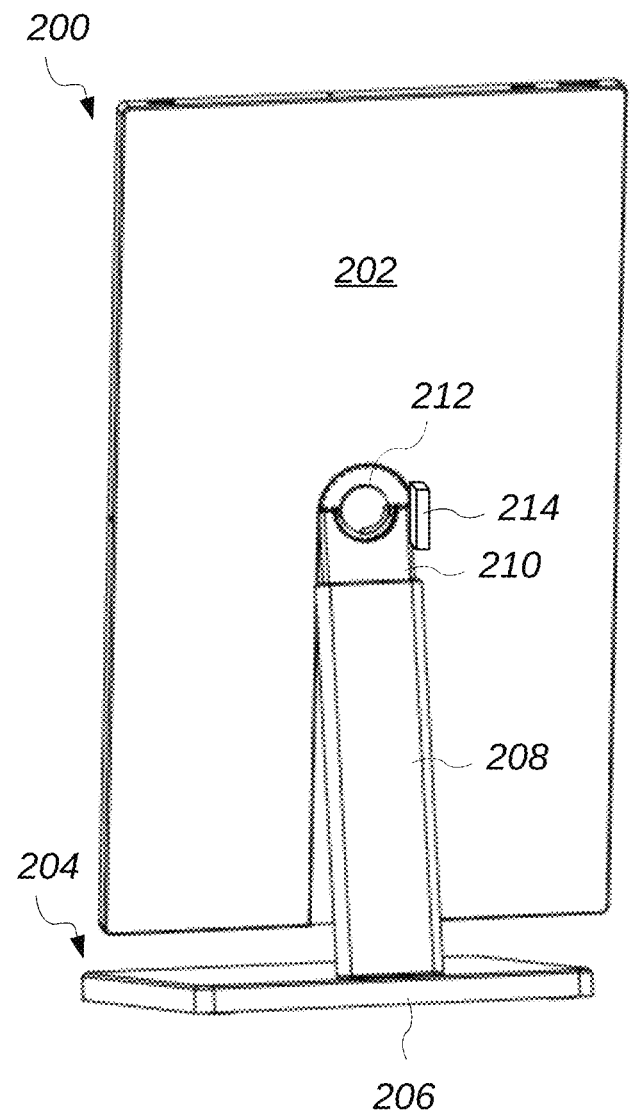
FIG. 17 illustrates a rear view of a portable computing device on a stand that allows rotation of the display screen of the device about an axis normal to the display screen.

FIG. 17 illustrates a rear view of a portable computing device on a stand that allows rotation of the display screen of the device about an axis normal to the display screen. The stand may be used, for example, to support touch screen device 102 in the terminal system described above relative to FIG. 1.

Touchscreen computing system 200 includes touch screen device 202 and stand 204. Stand 204 includes base 206, sleeve member 208, slide plate member 209 (shown in FIGS. 18 and 19), arm 210, disc 212, and actuator 214.

Touch screen device 202 includes body 216 (not shown in FIG. 17), a display screen (on the opposite side from that shown in FIG. 17). Touch screen device 202 also includes a computing device (e.g., CPU), circuit boards (e.g., graphics card), battery, sensors, and other components. Touch screen device 202 may be operable to display information and content to a user and receive input from the user.

Disc 212 may be hingably connected to arm 210. Disc 212 rotationally engages in socket 220 (not shown in FIG. 17) in rear panel 222 (not shown in FIG. 17) of touch screen device 202. Disc 212 may serve as a rotational member with respect to body 216 that allows rotation of the display screen of touchscreen device 202 about an axis perpendicular to the display screen.

Figure 18:
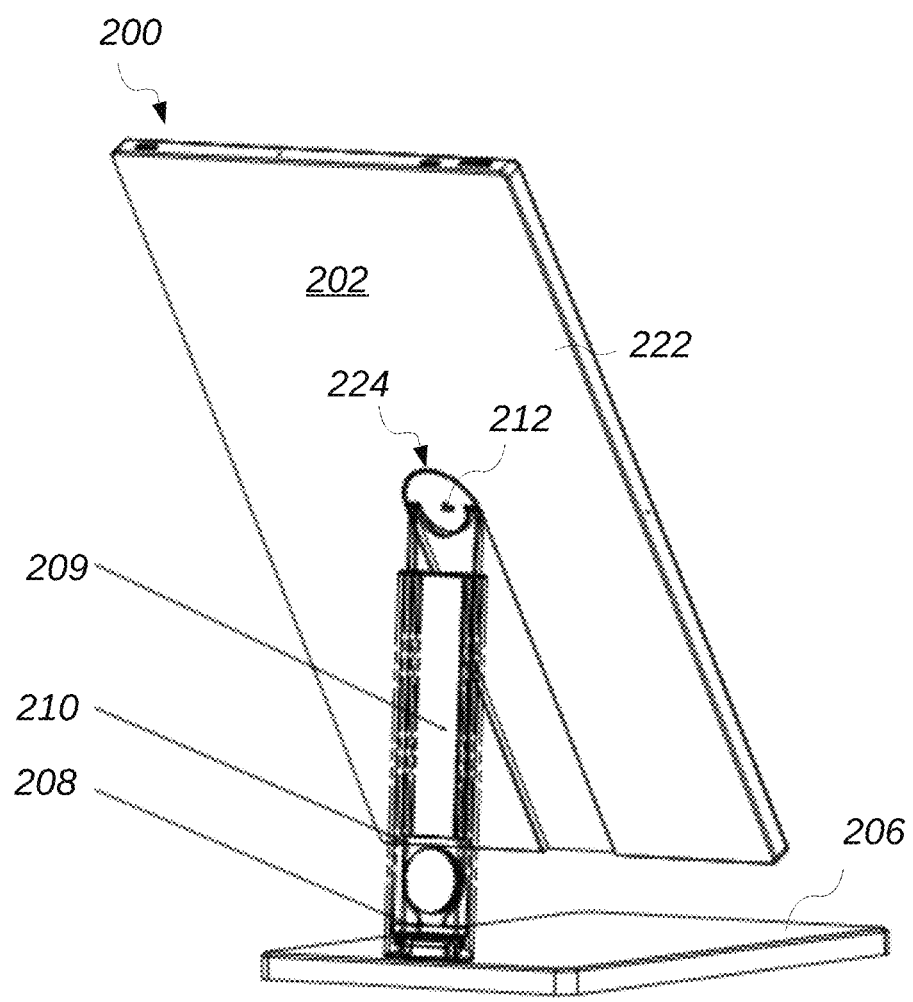
FIG. 18 shows a portable computing device on an adjustable stand.
Figure 19:
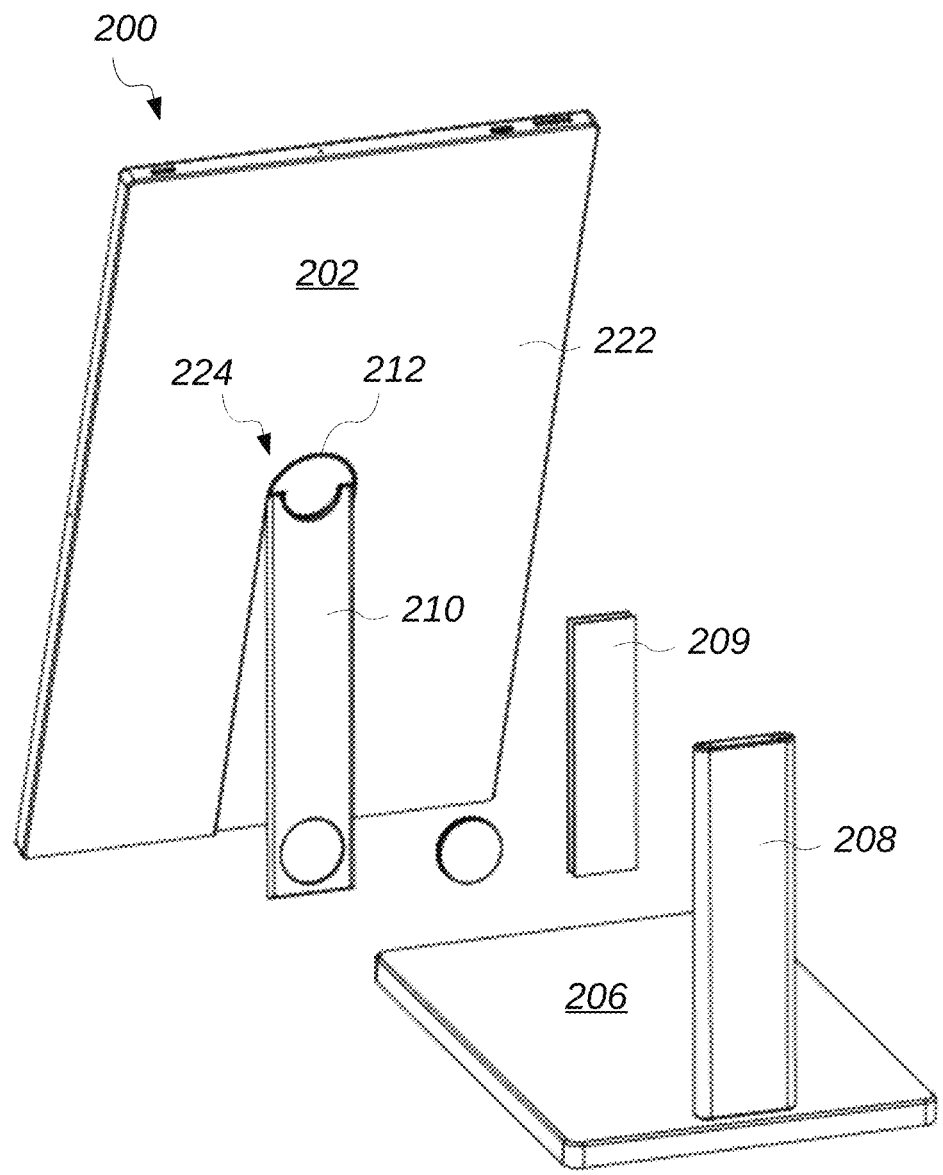
FIG. 19 shows the computing system with a partially exploded view of the stand.

FIG. 18 shows a portable computing device on an adjustable stand. FIG. 19 shows the portable computing device with a partially exploded view of the stand. Disc 212 may be rotatably connected to touch screen device 202 in socket 224. Arm 210 may be hingably coupled to disc 212. Stand 204 also includes base 206 and sleeve member 208. Arm 210 may be slidably received by sleeve member 208.

In the embodiment shown in FIG. 19, the stand includes some elements that remain attached to the touchscreen device (e.g., disc 212) and some elements that are separate (e.g., the base). A stand may, nevertheless, in some embodiments, be totally separable from the device it supports.

Figure 20A:
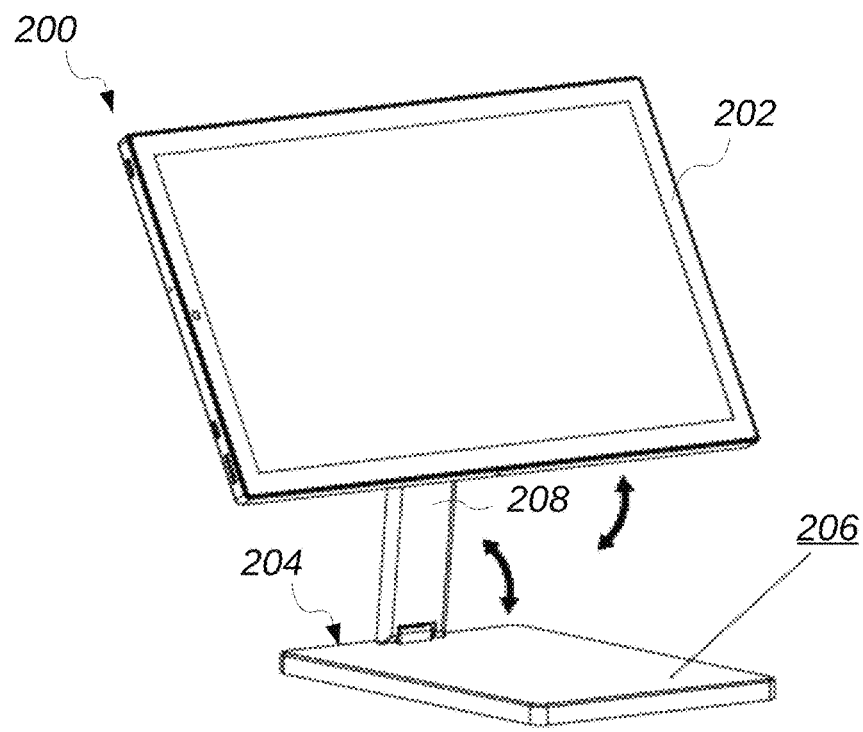
FIGS. 20A and 20B illustrates adjustment of a stand to alter the height of a touch screen display.
Figure 20B:
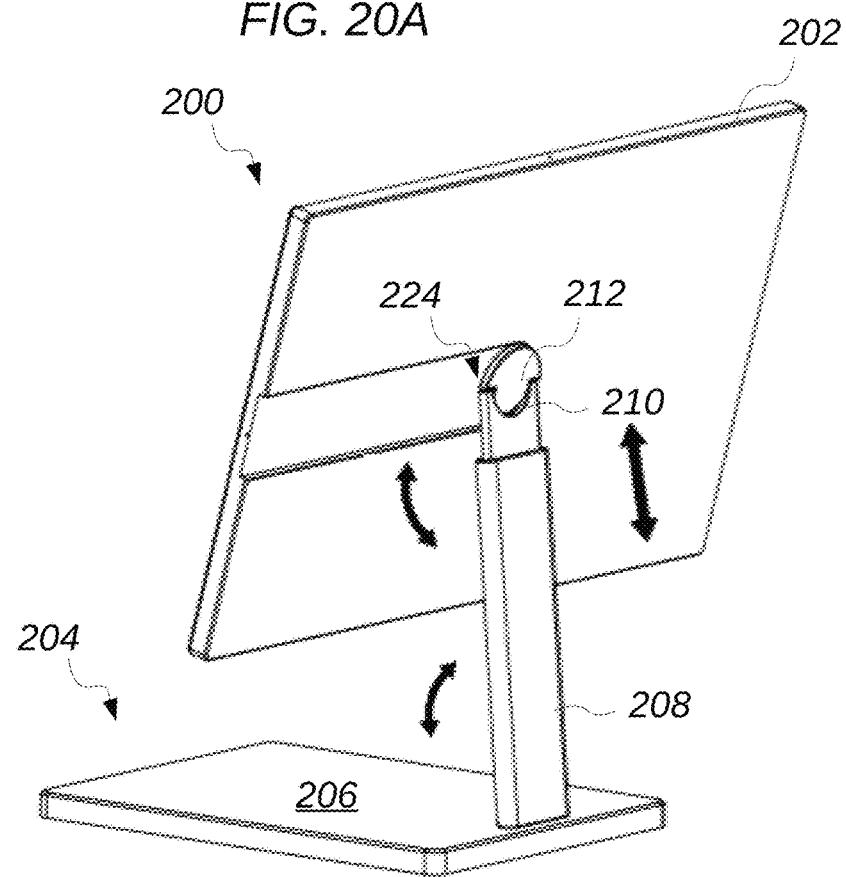

In some embodiments, a stand allows for height adjustment of a portable computing device. FIGS. 20A and 20B illustrate adjustment of a stand to alter the height of a touch screen display. FIG. 20A illustrates touch screen device 202 in a horizontal orientation on stand 204. In FIG. 20B, the height and angle of inclination of touch screen device 202 may be changed by sliding arm 210 up or down in sleeve member 208 as shown by the arrows.

Figure 21A:
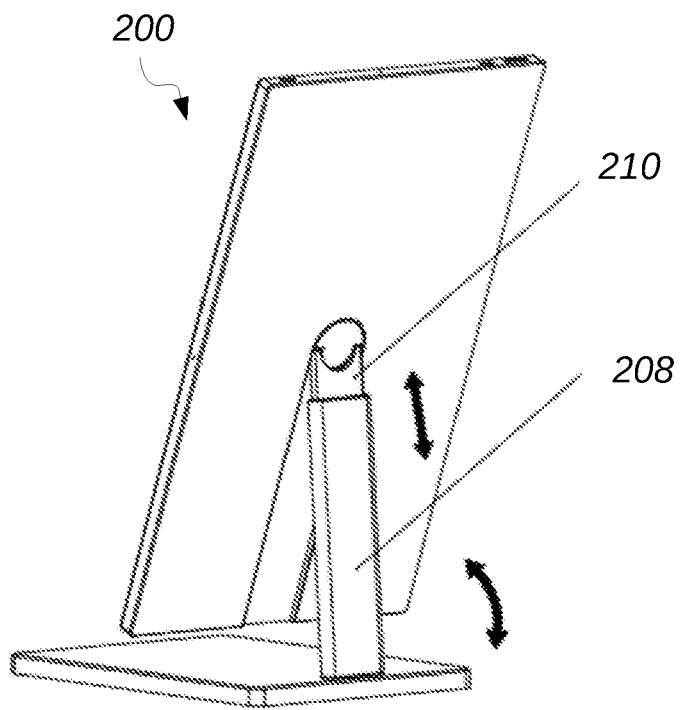
FIGS. 21A and 21B illustrates a stand that allows for movement of a portable computing device by swinging a sleeve member on a base, with FIG. 21A illustrating the portable computing device installed on the stand and FIG. 21B illustrating the portable computing device separated from the stand.
Figure 21B:
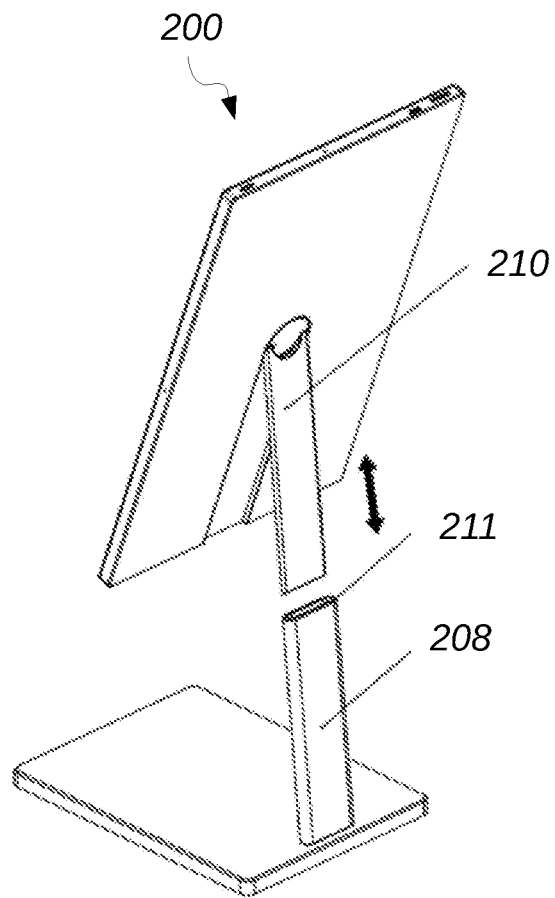

In some embodiments, the stand allows for positional adjustment of a portable computing device using hinged member. FIGS. 21A and 21B illustrates a stand that allows for movement of a portable computing device by swinging a sleeve member on a base. In FIGS. 21A and 21B, sleeve member 208 may adjustably hinge forward with respect to base 206 and sliding up and down in opening 211 of sleeve member 208. In some embodiments, lock mechanisms are included so that the height and/or angle of inclination can be locked. In coordination with adjustment of sleeve member 208 relative to base 206, touchscreen device 202 can be tilted relative to arm 210 as needed to maintain a suitable angle of inclination of the display screen.

Figure 22A:
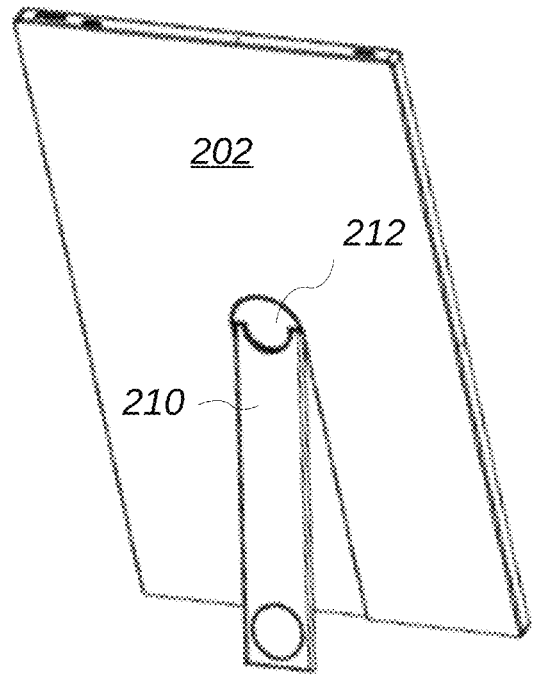
FIGS. 22A and 22B illustrate adjustment of a display from a vertical orientation to a horizontal orientation.
Figure 22B:
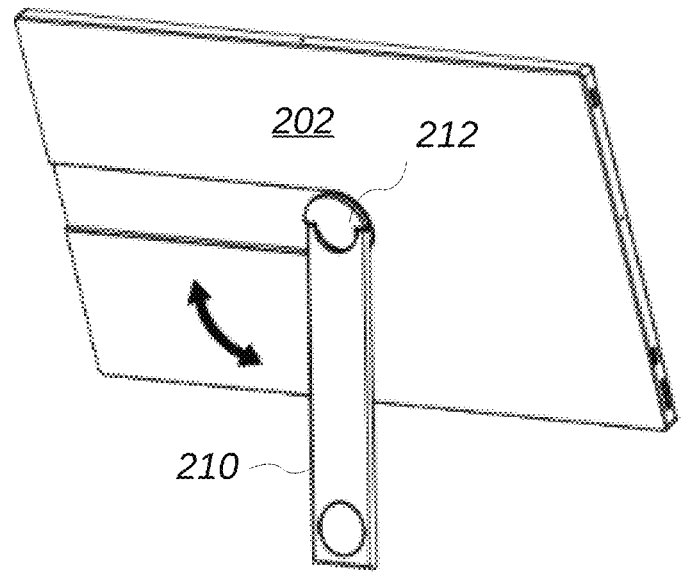

During use of the touchscreen device, the user can alter the orientation of the display by rotating the touchscreen device 202 about disc 212 while the disc and the arm remain stationary. FIGS. 22A and 16B illustrate adjustment of a display from a vertical orientation to a horizontal orientation (in FIGS. 16A and 16B, the sleeve member and base portions of the stand are omitted). FIG. 22A shows the display screen in a vertical orientation on arm 210. In FIG. 22B, touchscreen device 202 has been rotated in the direction of the arrows to change the device to a horizontal orientation.

Figure 23:
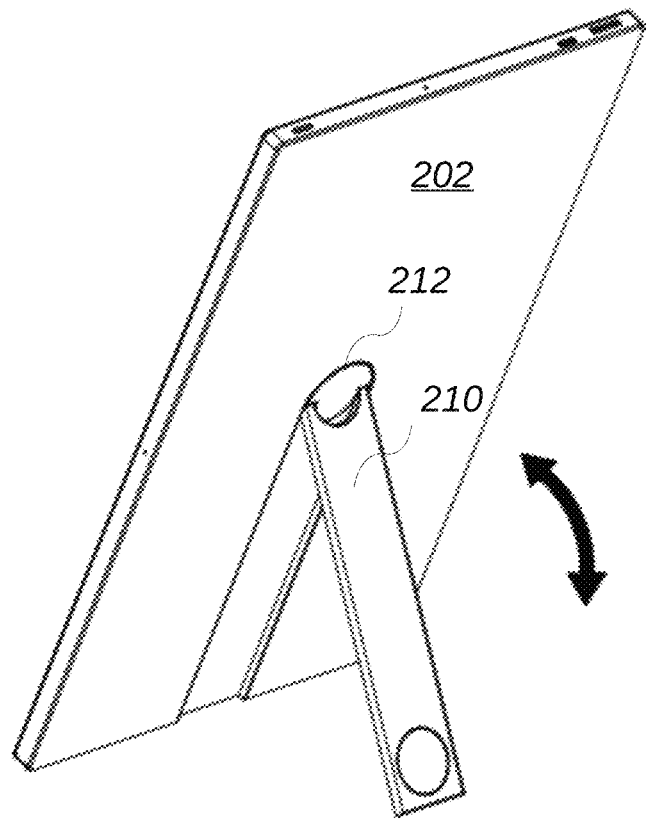
FIG. 23 illustrates a touch screen device supported by an adjustable arm with the display in an upright orientation.

In some embodiments, an arm rotatably coupled to a portable computing device may be adjusted to control position, orientation, and or tilt of a display screen of the device while the device is resting on a surface. A distal end of the arm may rest on the surface, as well as one or more edges of the portable computing device. FIG. 23 illustrates a touchscreen device supported by an adjustable arm with the display in an upright orientation. Arm 210 may be swung back or forward relative to the lower edge of touch screen device 202, thereby allowing a user to control the angle of inclination of the display screen of the device.

Figure 24:
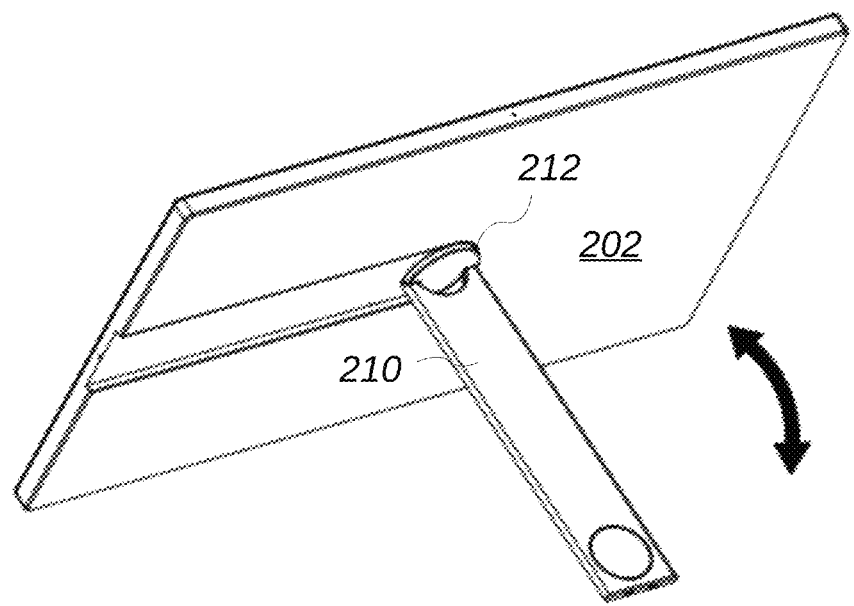
FIG. 24 illustrates the touch screen device supported by an adjustable arm with the display in a horizontal orientation.

FIG. 24 illustrates the touchscreen device supported by an adjustable arm with the display in a horizontal orientation. To adjust the device from the orientation and position shown in FIG. 22, disc 212 may be rotated 90 degrees in its socket, thereby realigning the long edge of arm 210 to be parallel with the long edge of touch screen device 202. Arm 210 may be swung back or forward relative to the lower edge (now, the long edge) of touch screen device 202, thereby allowing a user to control the angle of inclination of the display screen of the device.

Figure 25:
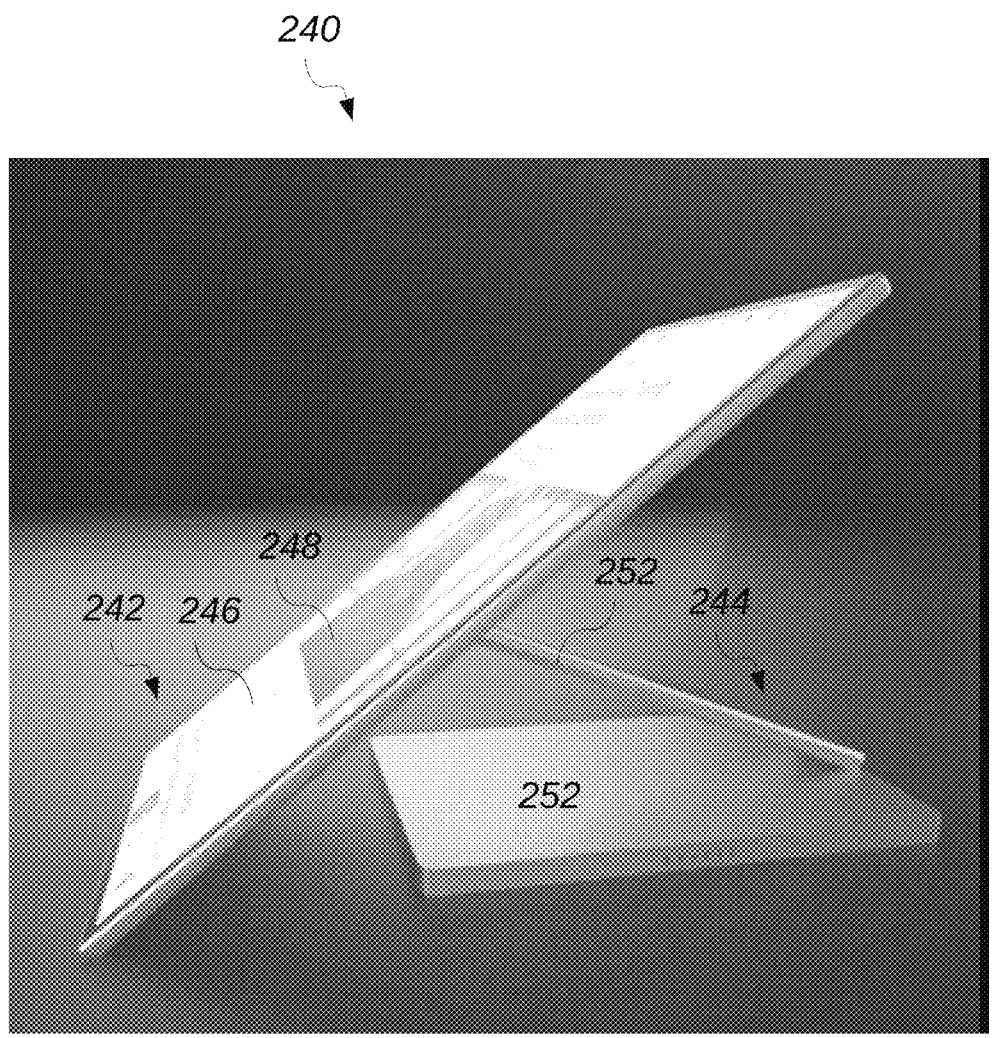
FIG. 25 illustrates an alternate embodiment of a computing system including an adjustable stand with a base.

FIG. 25 illustrates an alternate embodiment of a computing system including an adjustable stand with a base. Computing system 240 includes touchscreen device 242 and stand 244. Touchscreen device 242 includes body 246 and display screen 248. Stand 244 includes base 250 and arm 252. Hinge connections may be included between base 250 (shown as 252 in FIG. 25) and arm 252, and between arm 252 and body 246, thereby allowing for adjustment of the inclination angle of display screen 248. Stand 244 may be adjusted such that the lower edge of touchscreen device 242 rests on the same surface as base 250.

Figure 26:
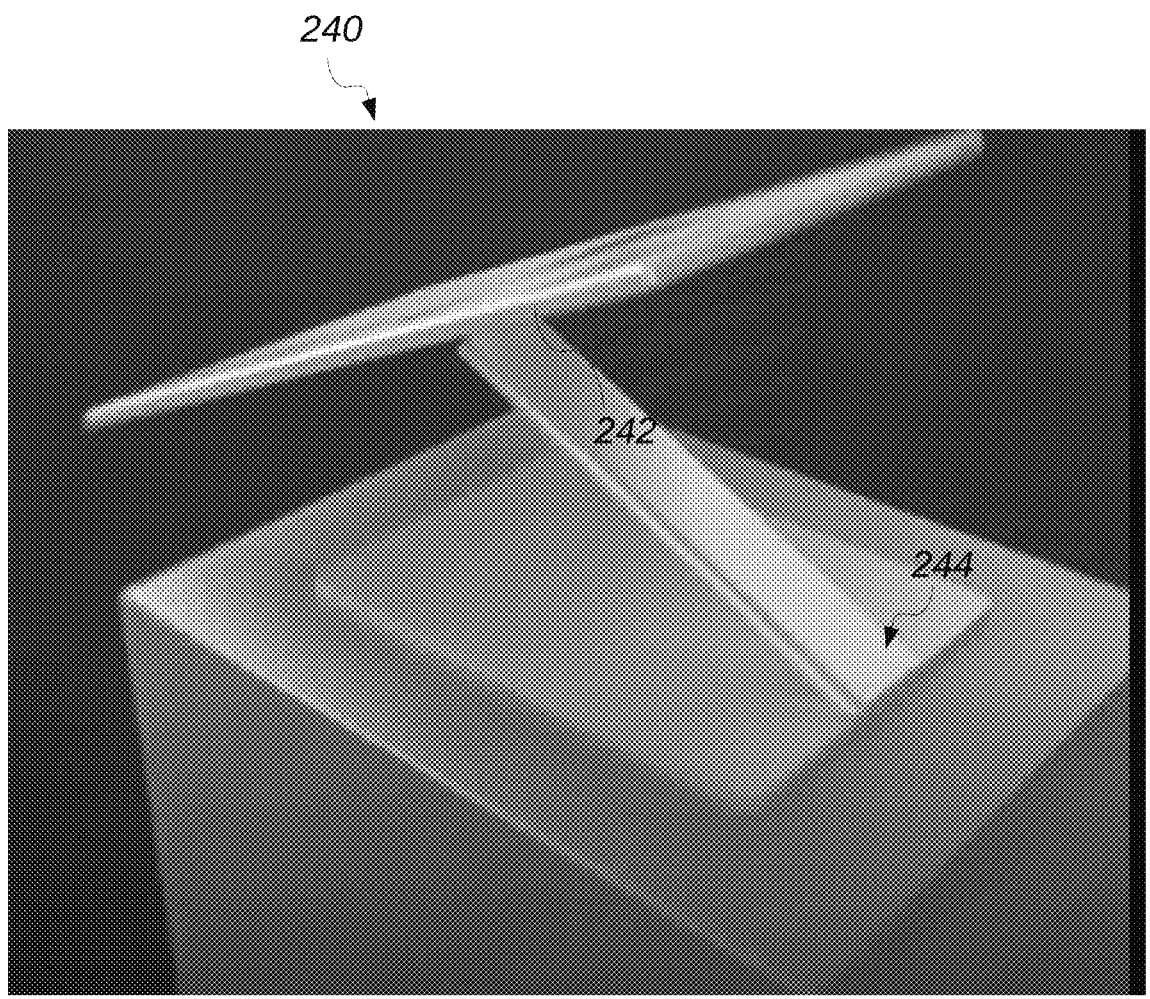
FIG. 26 is a rear view of a computing system including an adjustable stand with a base.

FIG. 26 is a rear view of the computing system shown in FIG. 25. Touchscreen device 242 may be rotational connected to arm 252 (not shown in FIG. 26). A user may raise touchscreen device off of the surface and rotate touchscreen device 242 on arm 252 such that display screen 248 (not shown in FIG. 26) rotates about an axis normal to the display screen.

Figure 27:
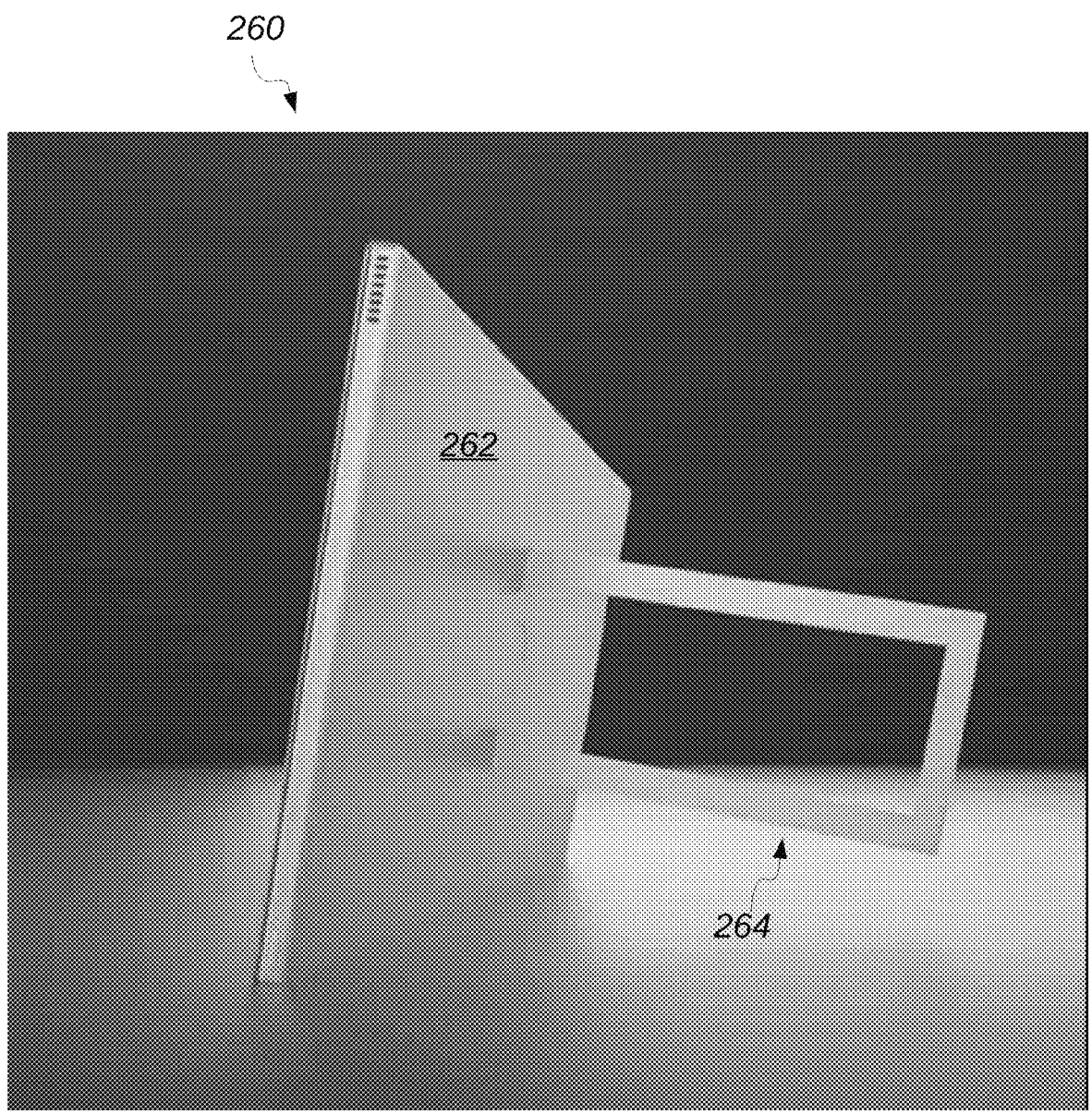
FIG. 27 illustrates an alternate embodiment of a computing system having a loop arm.

FIG. 27 illustrates an alternate embodiment of a computing system having a loop arm. Computing system 260 includes touchscreen device 262 and arm 264. Arm 264 is rotational coupled to the rear surface of touchscreen device 262.

Figure 28:
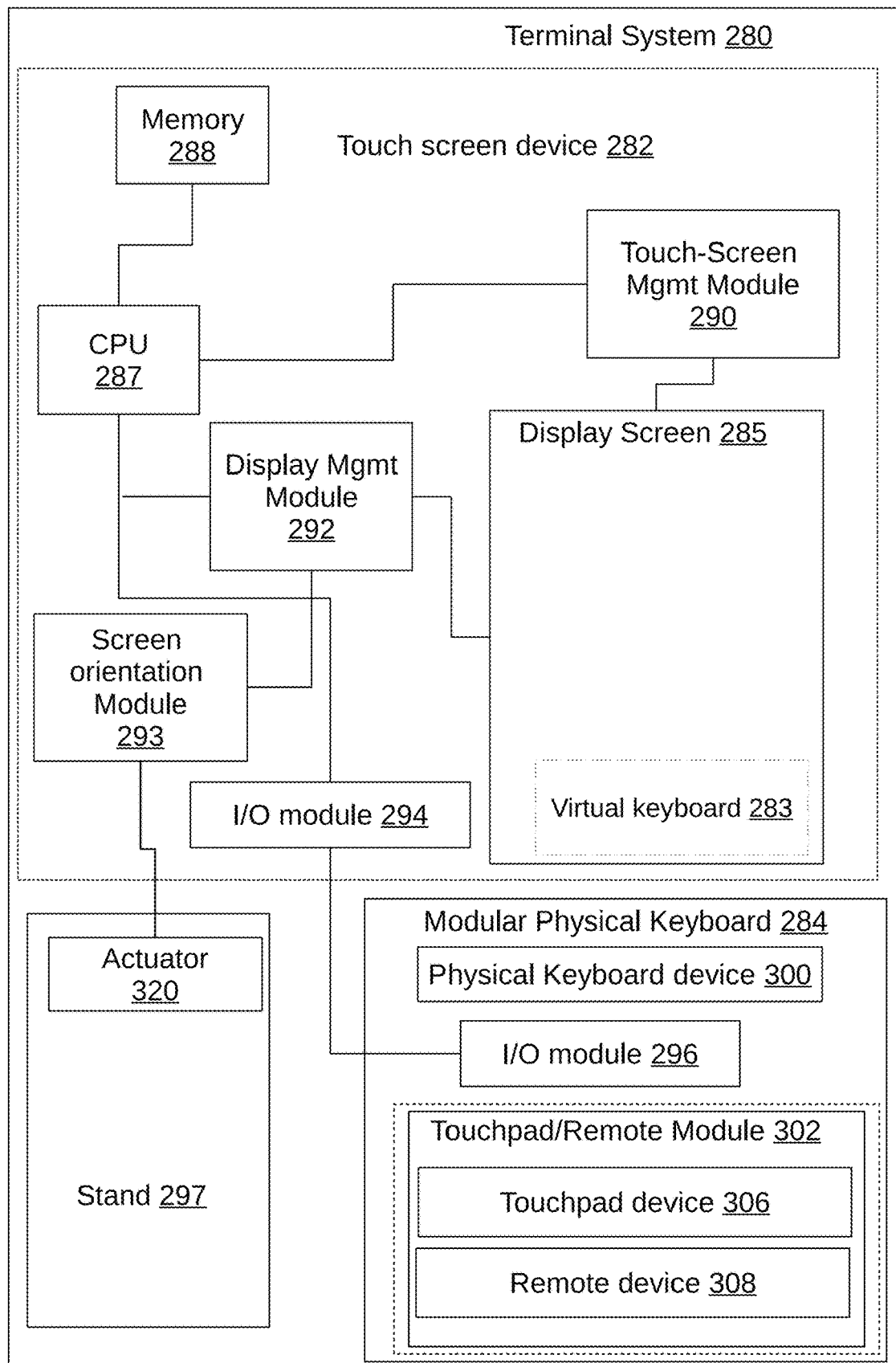
FIG. 28 is a schematic diagram illustrating one embodiment of terminal system having a touch screen device with a built-in virtual keyboard and a physical keyboard.

FIG. 28 is a schematic diagram illustrating one embodiment of terminal system having touch-screen device with a built-in virtual keyboard and a physical keyboard. Terminal system 280 includes touch-screen device 282 (with virtual keyboard 283), modular physical keyboard 284, and stand 297.

Touch screen device 282 includes display screen 285, CPU 287 memory 288, touch-screen management module 290, display management module 292, screen orientation module 293, and keyboard 110 module 294. Touch screen device 282 may include sensors (e.g., accelerometers, gravity sensors) to provide information to display management module 292 for use in controlling the display and/or actuator 320.

Modular physical keyboard 284 includes physical keyboard device 300, touchpad/remote module 302, and I/O module 296. Touchpad/remote module 302 includes touchpad device 306 and remote device 308. Modular physical keyboard 284 may be, for example, similar to that described above relative to FIGS. 1-10.

Display management module 292 may control the content of display screen 285. The content displayed on display screen 285 may be based on, among other things, the physical orientation of touch screen device 282 relative to gravity, the physical orientation of touch screen device 282 relative to one or more components of stand 297, or both. In various embodiments, control of screen content based on physical orientation of a computing device may be as further described in U.S. patent application Ser. No. 15/978,640 filed May 14, 2018, entitled "System, Apparatus, and Method for Optimizing Viewing Experience on an Intelligent Terminal", which is incorporated by reference as if fully set forth herein.

Stand 297 includes actuator 320. Actuator 320 may respond to signals from screen orientation module 293 to control the physical orientation of touch screen device 282. An actuator may include any of various mechanisms (e.g., a motorized drive) that cause rotation of the touch screen device relative to one or more components of stand 297.

Actuator 320 may be controlled by screen orientation module 293. In some embodiments, the physical orientation of touch screen device is controlled in coordination with the orientation of content on display screen 285 (e.g., the physical orientation is changed based on the orientation of content on display screen 285, or vice versa).

As noted above, a physical keyboard may be integrated into a touch panel's input system of a device, as an option to the device's virtual keyboard. In certain embodiments, the physical keyboard layout and input coordinates match exactly those of the virtual keyboard. The physical keyboard may be programmed to communicate with the controller and the software driver exactly as the virtual keyboard would, irrespective of the touch screen technology used (resistive, capacitive, SAW, IR, etc.).

The virtual keyboard may be enhanced such that it is fixed onto the touch panel screen until removed with a user command, and will no longer disappear once any point outside the keyboard is touched.

The terminal's touch panel may be enhanced so as to receive input independently from the screen's main display area and from either one of the keyboards in use.

The terminal's screen may also be enhanced to exhibit images and data onto one or more display areas and in particular, onto the substantial display area concealed by the virtual keyboard but now visible below the transparent physical keyboard.

Although, in some of the embodiments described above, a physical keyboard is coupled to a touch-screen device such that the physical keyboard is over a touch-screen display, an attached physical keyboard may be mounted such that the physical keyboard sits below the touch-screen display. In some embodiments, the bottom edge of the physical keyboard extends downwardly beyond the lower edge of the touch-screen device.

Although, in some of the embodiments described above, a user input device includes touchpad for a pointing device, a pointing device may in some embodiments be another type of pointing device. For example, a pointing device may be a mouse, trackball, or joystick.

Although, in some of the embodiments described above, a portable computing device is a touch screen device, a portable computing device may in some embodiments not include a touch screen.

Although, in some of the embodiments described above, the sections of the user input module are shown as flat panels, the sections of a user input module may, in some embodiments, may be flexible. For example, panels or interconnecting sections may be made of bendable material, such as an elastomeric material.

As used herein, "coupler" refers an element or combination of elements that couple two things together. Examples of a coupler may include a link, U-joint, band, hook, clamp, clip, pin/socket joint, tongue-and-groove joint, and similar connecting elements. In certain embodiments, a coupler includes magnetic elements that connect with other elements to form a connection.

As used herein, two elements are "hingably coupled" when the coupled elements swing (in, out, or in any other direction) with respect to one another.

As used herein, a "rotational member" is a member that rotates with respect to one or more components. Examples of a rotational member include a disc, a cylinder, a rod, a pin, a cylindrical bearing, or a ring. A rotational member may rotate include one or more internal or external cylindrical surfaces that rotate relative to a corresponding surface on a mating component (for example, a disc rotating in a cylindrical socket.

As used herein, a "stand" includes an element or combination of elements that, alone or in combination with portions of a device (such as a corner or edge of the device) support or the device is a desired orientation and/or position on a surface. A stand may be or include a holder, base, cradle, arm, block, or linkage. In some embodiments, all of a portion of a stand is attached to the device being supported (e.g., portable computing device, touch screen device, phone, or tablet).

As used herein, "terminal" includes any device that can receive input to a computing device from a user, and display information to the user from the computing device.

As used herein, a "terminal system" includes any device that includes one or more terminals. In some embodiments, a terminal system includes some or all of the components of the computing device physically integrated with (e.g., in the same housing as) input and display components. For example, the central processing unit of a hand-held computing device may be packaged with a touch-screen device.

As used herein, "touch-screen terminal system" includes any terminal system that receives input by way of a touch-screen.

As used herein, "physical keyboard" includes any device having physical keys to be pressed by a user that can be used to provide input to a computing device. A physical keyboard may include a base, pad, plate, or other structure on which individual keys are mounted. In some embodiments, a keyboard has electronic components for receiving input from the user's touching or depression of individual keys and transmitting signals to a computing device corresponding to the user's actions. In certain embodiments, a keyboard may be slab or block of material, portions of which are formed as individual keys (e.g., a molded rubber sheet with keys molded or otherwise formed on the upper surface of the sheet). In certain embodiments, a physical keyboard provides its input to a computing device as a physical intermediary between a user's finger and a touch screen.

As used herein, a "physical key" includes any key that is a physical object, or a portion, segment, or region of a physical object. A "physical key" does not include a key that only exists as a display element generated on a touch screen, such as a key displayed on a virtual keyboard.

As used herein, a "virtual key" is a key that appears as a discernable region of a display or screen (e.g., the touch display of a touch panel).

A terminal system may include, or be included as part of, a computer system or computing device. Computer systems and computing devices may, in various embodiments, include components such as a CPU with an associated memory medium such as a solid-state storage device or Compact Disc Read-Only Memory (CD-ROM). The memory medium may store program instructions for computer programs. The program instructions may be executable by the CPU. Computer systems may further include a display device such as monitor, an alphanumeric input device such as keyboard, and a directional input device such as mouse. Computer systems may be operable to execute the computer programs to implement computer-implemented systems and methods. A computer system may allow access to users by way of any browser or operating system.

Computer systems and computing devices may include a memory medium on which computer programs according to various embodiments may be stored. The term "memory medium" is intended to include an installation medium, e.g., Compact Disc Read Only Memories (CD-ROMs), a computer system memory such as Dynamic Random Access Memory (DRAM), Static Random Access Memory (SRAM), Extended Data Out Random Access Memory (EDO RAM), Double Data Rate Random Access Memory (DDR RAM), Rambus Random Access Memory (RAM), etc., or a non-volatile memory such as a magnetic media, e.g., a hard drive or optical storage. The memory medium may also include other types of memory or combinations thereof. In addition, the memory medium may be located in a first computer, which executes the programs or may be located in a second different computer, which connects to the first computer over a network. In the latter instance, the second computer may provide the program instructions to the first computer for execution. A computer system may take various forms such as a personal computer system, mainframe computer system, workstation, network appliance, Internet appliance, television system or other device. In general, the term "computer system" may refer to any device having a at least one processor that executes instructions from a memory medium.

The memory medium may store a software program or programs operable to implement embodiments as described herein. The software program(s) may be implemented in various ways, including, but not limited to, procedure-based techniques, component-based techniques, and/or object-oriented techniques, among others. For example, the software programs may be implemented using ActiveX controls, C++ objects, JavaBeans, Microsoft Foundation Classes (MFC), browser-based applications (e.g., Java applets), traditional programs, or other technologies or methodologies, as desired. A CPU executing code and data from the memory medium may include a means for creating and executing the software program or programs according to the embodiments described herein.

A computing system may include, and/or may be implemented as, multiple functional modules or components, with each module or component including one or more resources (e.g., computing resources, storage resources, database resources, etc.). A system may include more or fewer components or modules, and a given module or component may be subdivided into two or more sub-modules or sub-components. Also, two or more of the modules or components can be combined.

Some embodiments are set forth in the following clauses:

A1. A terminal system, including:
a portable computing device capable of receiving input from a user, the portable computing device including:
a display screen; and
one or more processors; and
a user input module that is physically separable from the portable computing device, wherein the user input module is configured to communicatively couple with the portable computing device, the user input module including:
a keyboard device including physical keys, wherein the keyboard device is configurable to provide input from the user to the portable computing device; and
a touchpad assembly including:
a touchpad device carrier; and
a touchpad device removably coupled to the touchpad device carrier, wherein the touchpad device includes:
a touchpad configurable to provide input from the user to the portable computing device when the user input module is coupled to the portable computing device, and a remote unit configurable to provide input from the user to the portable computing device when the user input module is coupled to the portable computing device.

A2. The terminal system of clause A1, wherein the user input module further includes:
a keyboard panel, wherein the keyboard device is included in the keyboard panel; and
a touchpad panel, wherein the touchpad assembly is included in the touchpad panel,
wherein the keyboard panel is foldable with respect to the touchpad panel,
wherein the keyboard panel and the touchpad panel are configured to unfold to form a cover for the display screen of the portable computing device.

A3. The terminal system of clause A1, wherein the portable computing device is a touch screen device.

A4. The terminal system of clause A1, wherein the portable computing device is a tablet computer.

A5. The terminal system of clause A1, further including a stand, wherein the portable computing device is mounted on the stand, wherein the portable computing device is configured to rotate on the stand about an axis normal to the display screen of the portable computing device.

A6. The terminal system of clause A1, wherein the portable electronic device is configured to modify a display on the display screen of the portable computing device in response to the orientation of the portable electronic device.

A7. The terminal system of clause A1, further including an actuator configured to, in response to information received from the portable computing device, rotate the body of the portable computing device to modify an orientation of the display screen.

A8. The terminal system of clause A1,
wherein the portable computing device is a touch-screen device including a virtual keyboard,
wherein the keyboard device has a layout and input coordinates that at least partially match those of the virtual keyboard,
wherein the keyboard device is made of a resilient material that allows one or more of the virtual keys to be actuated by a user by the user depressing a corresponding physical key of the physical keyboard.

A9. The terminal system of clause A1, wherein the user input module includes one or more attach strips or clips configured to mount the user input module on the portable computing device.

A10. The terminal system of clause A1, wherein the remote unit includes media playback controls.

A11. The terminal system of clause A1, wherein touchpad device and the remote unit are on opposite sides of the touchpad device.

B1. A user input module, including:
a keyboard device including physical keys, wherein the keyboard device is configurable to provide input from the user to the portable computing device when the user input module is coupled to the portable computing device; and
a touchpad assembly including:
a touchpad device carrier; and
a touchpad device removably coupled to the touchpad device carrier, wherein the touchpad device includes:
a touchpad configurable to provide input from the user to the portable computing device when the user input module is coupled to the touch panel device, and
a remote unit configurable to provide input from the user to the portable computing device when the user input module is coupled to the touch panel device.

C1. A user input device for a portable computing device, including:
a housing;
a touchpad device coupled to the housing; and
a remote-control device coupled to the housing.

D1. A method of using a terminal system, including:
removing a touchpad device from a user input module having a physical keyboard,
operating the physical keyboard to control a portable computing device; and
operating the touchpad device to remotely control the portable computing device.

E1. A terminal system, including:
a portable computing device capable of receiving input from a user, the portable computing device including:
a display screen; and
one or more processors; and
a user input module that is physically separable from the portable computing device, wherein the user input module is configured to communicatively couple with the portable computing device, the user input module including:
a keyboard device section including physical keys, wherein the keyboard device is configurable to provide input from the user to the portable computing device when the user input module is coupled to the portable computing device; and
a pointing device section including a pointing device,
wherein the pointing device section of the user input module is foldable with respect to the keyboard device section of the user input module,
wherein the keyboard device section of the user input module and the pointing device section of the user input module are configurable to fold with respect to one another.

E2. The terminal system of clause E1, wherein the keyboard device section and the pointing device section are configurable to form a cover for the portable computing device.

E3. The terminal system of clause E1, wherein the pointing device includes a touchpad device.

E4. The terminal system of clause E1, wherein the pointing device includes a touchpad device,
wherein the touchpad device removably coupled to a touchpad device carrier, wherein the touchpad device includes:
a touchpad configurable to provide input from the user to the portable computing device when the user input module is coupled to the touch panel device, and
a remote unit configurable to provide input from the user to the portable computing device when the user input module is coupled to the touch panel device.

E5. The terminal system of clause E1, wherein the pointing device is configurable to fold back onto the back side of the portable computing device while the keyboard device is coupled on the front side of the portable computing device.

E6. The terminal system of clause E1, wherein the user input module includes a linking section coupled between the keyboard device section and the pointing device section, wherein the linking section spaces the adjoining edges of the keyboard device section and the pointing device section such that the keyboard device section can lay flat on the front side of the portable computing device while the pointing device section lies flat against the rear side of the portable computing device.

E7. The terminal system of clause E1, wherein the user input module includes a mount pad coupled to the keyboard device section or the pointing device section, wherein the mount pad is configured to hold the portable computing device while the user input module rests on a flat surface.

E8. The terminal system of clause E1, wherein the portable computing device is a touch-screen device.

E9. The terminal system of clause E1, wherein the portable computing device is a tablet computer.

E10. The terminal system of clause E1, further including a stand, wherein the portable computing device is mounted on the stand, wherein the portable computing device is configured to rotate on the stand about an axis normal to the display screen of the portable computing device.

E11. The terminal system of clause E1, wherein the portable electronic device is configured to modify a display on the display screen of the portable computing device in response to the orientation of the portable electronic device.

E12. The terminal system of clause E1, further including an actuator configured to, in response to information received from the portable computing device, rotate the body of the portable computing device to modify an orientation of the display screen.

E13. The terminal system of clause E1,
wherein the portable computing device is a touch-screen device including a virtual keyboard,
wherein the device keyboard has a layout and input coordinates that at least partially match those of the virtual keyboard,
wherein the physical keyboard is made of a resilient material that allows one or more of the virtual keys to be actuated by a user by the user depressing a corresponding physical key of the physical keyboard.

E14. The terminal system of clause E1, wherein the user input module includes one or more strips or clips configured to mount the user input module on the portable computing device.

F1. A user input module, including:
a keyboard device section including physical keys, wherein the keyboard device is configurable to provide input from the user to a portable computing device when the user input module is coupled to the portable computing device; and
a pointing device section including a pointing device, wherein the pointing device section of the user input module is foldable with respect to the keyboard device section of the user input module,
wherein the keyboard device section of the user input module and the pointing device section of the user input module are configurable to fold out into a cover for the display screen of the portable computing device.

G1. A method of using a terminal system, including:
folding or unfolding two or more sections of a user input module relative to one another, wherein one of the sections includes a physical keyboard device and another one of the sections includes a pointing device; and
operating the physical keyboard to control a portable computing device.

G2. The method of clause G1, further including operating the pointing device to remotely control the portable computing device.

G3. The method of clause G1, wherein folding or unfolding two or more sections of a user input module relative to one another includes coupling the user input module to the portable computing device.

H1. A terminal system, including:
a portable computing device including:
a body;
a display screen; and
a processor; and
a stand including:
an arm; and
a coupler movably coupled to the arm and coupled to the portable computing device,
wherein the coupler of the stand is configured to allow the portable computing device to move such that the body rotates about an axis perpendicular to the display screen while the arm is in a fixed position,
wherein the arm of the stand includes a distal end, wherein the arm is positionable with respect to the portable computing device such that, when a portion of the portable computing device is resting on a surface, the distal end of the arm rests on the surface so as to maintain the portable computing device at a desired angle with respect to the surface.

H2. The terminal system of clause H1, wherein the coupler is configured to magnetically couple to the body of the portable computing device.

H3. The terminal system of clause H1, wherein the stand further includes a base,
wherein the arm is configured to removably couple to the base,
wherein, when the arm of the stand is coupled to the base, the base is configurable to support the portable computing device at a desired angle with respect to the surface.

H4. The terminal system of clause H3, wherein the base includes a sleeve member, wherein the sleeve is configured to slidably receive the arm,
wherein, when the arm is received in the sleeve member, the base is configurable to support at least a portion of the portable computing device on a surface.

H5. The terminal system of clause H1, wherein the coupler is universally coupled to the arm.

H6. The terminal system of clause H1, wherein the stand further includes a base coupled to the arm, wherein the arm is hingably coupled to the base such that the arm can be swung forward relative to the base while the portable electronic device is coupled to the stand.

H7. The terminal system of clause H1, wherein the portable electronic device is configured to modify a display on the display screen of the portable computing device in response to the orientation of the portable electronic device.

H8. The terminal system of clause H1, further including an actuator configured to, in response to information received from the portable computing device, rotate the body of the portable computing device to modify an orientation of the display screen.

H9. The terminal system of clause H1, wherein the coupler is hingably coupled to the arm, wherein the body of the portable electronic device is rotatably coupled to the coupler such as to allow rotation of the body of the portable computing device with respect to the arm.

H10. The terminal system of clause H1, wherein the coupler includes a disc hingably coupled to the arm, wherein the portable computing device rotates with respect to the disc.

H11. The terminal system of clause H1, wherein the coupler is rotatably coupled to the arm such as to allow rotation of the body of the portable electronic device with respect to the arm.

H12. The terminal system of clause H1, wherein the arm includes a U-shape.

H13. The terminal system of clause H1, wherein the arm includes a flat-bottomed distal end.

H14. The terminal system of clause H1, wherein the arm includes a flat-bottomed ring.

H15. The terminal system of clause H1, wherein the portable computing device includes a recess for the arm, wherein at least a portion of the arm is positionable in the recess.

I1. A stand for a portable computing device, including:
- an arm; and
- a coupler movably coupled to the arm and coupled to the portable computing device,
- wherein the coupler of the stand is configured to allow the portable computing device to move such that the body rotates about an axis perpendicular to the display screen while the arm is in a fixed position, and
- wherein the arm of the stand includes a distal end, wherein the arm is positionable with respect to the portable computing device such that, when a portion of the portable computing device is resting on a surface, the distal end of the arm rests on the surface so as to maintain the portable computing device at a desired angle with respect to the surface.

J1. A method, including:
- rotating a portable computing device relative to the arm of a stand for the device to alter a screen orientation relative to the arm; and
- arranging the arm to at least partially support the portable computing device on a surface with the display screen at a user-selected angle relative to the surface.

K1. A terminal system, including:
- a portable computing device including:
  - a body;
  - a display screen; and
  - a processor; and
- a stand including:
  - an arm; and
  - a coupler movably coupled to the arm and coupled to the portable computing device; and
  - a base,
- wherein the coupler of the stand is configured to allow the portable computing device to move such that the body rotates about an axis perpendicular to the display screen while the arm is in a fixed position, and
- wherein, when the arm of the stand is coupled to the base, the base is configurable to support the portable computing device at a desired angle with respect to the surface.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Methods may be implemented manually, in software, in hardware, or a combination thereof. The order of any method may be changed, and various elements may be added, reordered, combined, omitted, modified, etc. Changes may be made in the elements described herein without departing from the spirit and scope of the invention as described in the following claims. In addition, none of the claims is intended to invoke 35 U.S.C. Section 112(f) unless the exact words "means for" are followed by a gerund.

What is claimed is:

1. A terminal system, comprising:
   a display device comprising:
     a body;
     a display screen; and
     a processor; and
     wherein the display device is configured to receive, via a wireless connection, display data from a smartphone;
   a stand comprising:
     an arm comprising a distal end;
     a coupler movably coupled to the arm and coupled to the display device; and
     a base,
     wherein the arm is configured to removably couple to the base; and
   a motorized actuator,
   wherein the coupler of the stand is configured to allow the display device to move such that the body rotates about an axis perpendicular to the display screen while the arm is in a fixed position,
   wherein the distal end of the arm is positionable with respect to the display device such that the distal end of the arm is supported on a flat surface and such that the arm maintains the display device at a fixed, declined angle with respect to the flat surface,
   wherein the display device is configured to, in response to information received from the smartphone via the wireless connection with the display device, operate the motorized actuator to rotate the body of the display device to modify a physical orientation of the display screen while the distal end of the arm is supported on the surface to maintain the display screen of the display device at the fixed, declined angle with respect to the surface,
   wherein the display device is configured to, when the body of the display device is rotated by the motorized actuator while the display screen is maintained at the fixed, declined angle to modify a physical orientation of the display screen to a horizontal physical orientation or to a vertical physical orientation, modify a display on the display screen of the display device based at least in part on information from the smartphone, and
   wherein, when the arm of the stand is coupled to the base, the base is configurable to support the display device at a desired angle with respect to the surface.

2. The terminal system of claim 1, wherein modifying the display on the display screen of the display device comprises generating a display based at least in part on display data from the smartphone.

3. The terminal system of claim 1, wherein modifying the display on the display screen of the display device comprises generating an image based at least in part on an image displayed on the smartphone.

4. The terminal system of claim 1, wherein modifying the display on the display screen of the display device is based at least in part on an indication of an orientation of the smartphone.

5. The terminal system of claim 1, wherein the wireless connection between the display device and the smartphone comprises a Bluetooth connection.

6. The terminal system of claim 1, wherein the wireless connection between the display device and the smartphone comprises a Wi-Fi connection.

7. The terminal system of claim 1, wherein the wireless connection between the display device and the smartphone comprises an NFC connection.

8. A terminal system, comprising:
a display device comprising:
a body;
a display screen; and
a processor; and
a stand comprising:
an arm comprising a distal end;
a coupler movably coupled to the arm and coupled to the display device, and
a base,
wherein the arm is configured to removably couple to the base; and
a motorized actuator;
wherein the coupler of the stand is configured to allow the display device to move such that the body rotates about an axis perpendicular to the display screen while the arm is in a fixed position,
wherein the distal end of the arm is positionable with respect to the display device such that the distal end of the arm is supported on a flat surface and such that the arm maintains the display device at a fixed, declined angle with respect to the surface,
wherein the display device is configured to operate the motorized actuator to rotate the body of the display device to modify a physical orientation of the display screen while the distal end of the arm is supported on the surface to maintain the display screen of the display device at the fixed, declined angle with respect to the surface,
wherein the display device is configured to, when the body of the display device is rotated by the motorized actuator while the display screen is maintained at the fixed, declined angle to modify a physical orientation of the display screen to a horizontal physical orientation or to a vertical physical orientation, modify a display on the display screen of the display device such that an orientation of content on the display is coordinated with the physical orientation of the display screen of the display device, and
wherein, when the arm of the stand is coupled to the base, the base is configurable to support the display device at a desired angle with respect to the surface.

9. The terminal system of claim 8, wherein the coupler is universally coupled to the arm.

10. The terminal system of claim 8, wherein the arm is hingably coupled to the base such that the arm can be swung forward relative to the base while the display device is coupled to the stand.

11. The terminal system of claim 8, wherein the coupler is hingeably coupled to the arm, wherein the body of the display device is rotatably coupled to the coupler such as to allow rotation of the body of the display device with respect to the arm.

12. The terminal system of claim 8, wherein the coupler comprises a disc hingably coupled to the arm, wherein the display device rotates with respect to the disc.

13. The terminal system of claim 4, wherein the arm comprises a flat-bottomed distal end.

14. The terminal system of claim 8, wherein modifying the display on the display screen of the display device comprises generating a display based at least in part on display data from an electronic device coupled to the display device by way of a wireless connection.

15. The terminal system of claim 8, wherein modifying the display on the display screen of the display device comprises generating an image based at least in part on an image displayed on an electronic device coupled to the display device by way of a wireless connection.

16. The terminal system of claim 8, wherein modifying the display on the display screen of the display device is based at least in part on an indication of an orientation of an electronic device coupled to the display device by way of a wireless connection.

17. A method, comprising:
arranging an arm of a stand such that a distal end of the arm is supported on a flat surface and such that a display screen of a display device on the stand is supported on the stand at a fixed, declined angle with respect to the surface,
rotating, by a motorized actuator, in response to information received from the display device, a display screen of the display device relative to the arm of the stand to modify a physical orientation of the display screen while the distal end of the arm is supported on the surface to maintain the display screen of the display device at the fixed, declined angle with respect to the surface; and
modifying, by the display device, when the body of the display device is rotated by the motorized actuator while the display screen is maintained at the fixed, declined angle to modify a physical orientation of the display screen to a horizontal physical orientation or to a vertical physical orientation, a display on the display screen of the display device such that an orientation of content on the display is coordinated with a physical orientation of the display screen of the display device; and
removably installing the arm on a base, wherein the base is configurable to support the display device on the surface with the display screen at a user-selected angle relative to the surface.

* * * * *